US011375029B2

(12) United States Patent
Mikityuk et al.

(10) Patent No.: US 11,375,029 B2
(45) Date of Patent: Jun. 28, 2022

(54) METHODS AND SYSTEMS FOR SERVICE DISCOVERY AND TUNNELING IN A DISTRIBUTED ARCHITECTURE

(71) Applicant: Deutsche Telekom AG, Bonn (DE)

(72) Inventors: Alexandra Mikityuk, Berlin (DE); Martin Exequial Zulliger Pizarro, Berlin (DE); Eugen Osiptschuk, Berlin (DE); Alexander Manecke, Berlin (DE); Manuel Rodriquez Franco, Burgos (ES); Maksim Sukhotin, St. Petersburg (RU)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/198,324

(22) Filed: Mar. 11, 2021

(65) Prior Publication Data

US 2021/0289038 A1   Sep. 16, 2021

(30) Foreign Application Priority Data

Mar. 13, 2020   (EP) .................................... 20163076

(51) Int. Cl.
*G06F 15/16*   (2006.01)
*H04L 67/51*   (2022.01)
(Continued)

(52) U.S. Cl.
CPC .............. *H04L 67/16* (2013.01); *H04L 67/02* (2013.01); *H04L 67/1023* (2013.01)

(58) Field of Classification Search
CPC ..... H04L 67/16; H04L 67/02; H04L 67/1023; G06F 9/465
See application file for complete search history.

(56) References Cited

U.S. PATENT DOCUMENTS 10,992,670 B1 *   4/2021   Drooger .............. H04L 12/4641
2004/0044727 A1 *   3/2004   Abdelaziz ............. H04L 67/107
                                                              709/203

(Continued)

FOREIGN PATENT DOCUMENTS

EP       3528112       8/2019

OTHER PUBLICATIONS

Sylvia Ratnasamy, et al., "A Scalable Content-Addressable Network", SIGCQM'01, Aug. 27-31, 2001, pp. 1-13, ACM, San Diego, California, USA.

(Continued)

*Primary Examiner* — John B Walsh
(74) *Attorney, Agent, or Firm* — Leydig, Voit & Mayer, Ltd.

(57) ABSTRACT

A method for distributed service management includes; running, by client nodes and service provider nodes, respective instances of a distributed service management unit, wherein the distributed service management unit comprises a distributed hash set table (DHST); providing, by the distributed service management unit, an application programming interface (API), wherein all connections between a client node and a service provider node are tunneled through the API; registering, by a service provider, a service on a network node; storing, by the registering network node, an endpoint of the service in a dataset of the DHST with a key corresponding to the service; requesting, by the client node, the service; and returning, by the distributed service management unit, all endpoints stored in the DHST with the key corresponding to the service.

17 Claims, 11 Drawing Sheets

(51) Int. Cl.
*H04L 67/02* (2022.01)
*H04L 67/1023* (2022.01)

(56) References Cited

U.S. PATENT DOCUMENTS

| | | | | |
|---|---|---|---|---|
| 2008/0307069 A1* | 12/2008 | Froment | ............ | H04L 65/1006 709/218 |
| 2014/0237539 A1* | 8/2014 | Wing | ............... | H04L 69/22 726/1 |
| 2016/0337426 A1* | 11/2016 | Shribman | ............ | H04N 21/6125 |
| 2020/0267185 A1* | 8/2020 | Smyth | ............... | H04L 67/02 |

OTHER PUBLICATIONS

Antony Rowstron, et al., "Pastry: Scalable, decentralized object location and routing for large-scale peer-to-peer systems", Proceedings of the 18$^{th}$ IFIP/ACM International Conference on Distributed Systems Platforms (Middleware 2001), Nov. 2001, pp. 1-22, Springer, Berlin, Germany.

Ion Stoica, et al., "Chord: A Scalable Peer-to-peer Lookup Service for Internet Applications", Aug. 27-31, 2001, pp. 1-12, ACM, San Diego, California, USA.

Ben Y. Zhao, et al., "Tapestry: A Resilient Global-Scale Overlay for Service Deployment", IEEE Journal On Selected Areas In Communications, Jan. 1, 2004, pp. 41-53, vol. 22, No. 1, IEEE, Piscataway, NJ, USA.

Petar Maymounkov, et al., "Kademlia: A Peer-to-Peer Information System Based on the XOR Metric", International Workshop on Peer-to-Peer Systems, Oct. 10, 2002, pp. 53-65, Springer, Berlin, Germany.

Microsoft Research, "Building Decentralized Systems Using DHTs—Part 2", https://www.youtube.com/watch?v=BsV-4aj7PTo, from minute 18 to 19—use of lists and merging, Aug. 31, 2020, p. 1, XP054980824, Retrieved from Internet on Aug. 31, 2020.

Federica Paganelli, et al., "A DHT-based Discovery Service for the Internet of Things", Journal of Computer Networks and Communications, Sep. 17, 2012, pp. 1-11, vol. 2012, Hindawi Publishing Corporation, London, United Kingdom.

\* cited by examiner

METHODS AND SYSTEMS FOR SERVICE DISCOVERY AND TUNNELING IN A DISTRIBUTED ARCHITECTURE

CROSS-REFERENCE TO PRIOR APPLICATIONS

Priority is claimed to European Patent Application No. EP 20163076.1, filed on Mar. 13, 2020, the entire disclosure of which is hereby incorporated by reference herein.

FIELD

The present invention relates to methods and systems for network service management in a distributed architecture. Exemplary embodiments of the invention relate to a system and method for a Distributed Hash Set Table in a distributed architecture. Exemplary embodiments of the invention further relate to a method and a system for service discovery in a distributed architecture. Exemplary embodiments of the invention further relate to a method and a system for message relay in a distributed architecture.

BACKGROUND

With an ever increasing number of connected network devices and bandwidth of data networks, distributed management will become increasingly important. Therefore, blockchain as a method and a system has become very popular. Blockchains are known to offer a plurality of advantages vis-à-vis conventional data processing methods and systems. A first exemplary advantage is that the data is stored in a distributed ledger instead of on a central server, and therefore, the risk of data-loss is reduced. A further exemplary advantage is the feasibility of manipulation proof transactions, which allows for the generation of a blockchain based currency. Other advantages may relate to: identity services, storage services, smart contracts, Internet-of-Things (IoT) services, data provenance, etc.

A number of blockchains, blockchain based services, and/or blockchain related services exist. However, most of the currently available blockchains focus on a single specific application.

A Management Ecosystem of Superdistributed Hashes (MESH) provides a data processing network with an operating stack, which has at least one blockchain. The operating stack has at least two interfaces. The operating stack is connected to the blockchain via a first interface, also referred to as a southbound interface, and the operating stack is connected to at least one application via a second interface, also referred to as a northbound interface. The blockchain has at least one function. Additionally or alternatively, the blockchain may also have at least one property. Said northbound interface allows the application to access at least one of the blockchain functions and/or properties through the operating stack.

EP 3 528 112 A1 relates to the basic distributed architecture of such a MESH system. The definitions provided in EP 3 528 112 A1 are hereby incorporated by reference.

Despite the many advantages such a distributed architecture offers, there are also some problems to be solved: It is inherently difficult to register a service in a distributed infrastructure such that clients can query the service from any node of the network. Furthermore, the communication between nodes and/or services is influenced or restricted if some of the nodes are behind Network Address Translation (NAT)/firewalls and/or in other network configurations.

SUMMARY

In an exemplary embodiment, the present invention provides a method for distributed service management in a distributed data processing network comprising a plurality of network nodes. The method includes: running, by client nodes and service provider nodes, respective instances of a distributed service management unit of the distributed data processing network, wherein the distributed service management unit comprises a distributed hash set table (DHST) configured to store and retrieve one or more datasets, wherein each dataset comprises a key and one or more values, and wherein the DHST is indexed by the key; providing, by the distributed service management unit, an application programming interface (API), wherein all connections between a client node and a service provider node are tunneled through the API; registering, by a service provider, a service on a network node; storing, by the registering network node, an endpoint of the service in a dataset of the DHST with a key corresponding to the service; requesting, by the client node, the service; and returning, by the distributed service management unit, all endpoints stored in the DHST with the key corresponding to the service.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
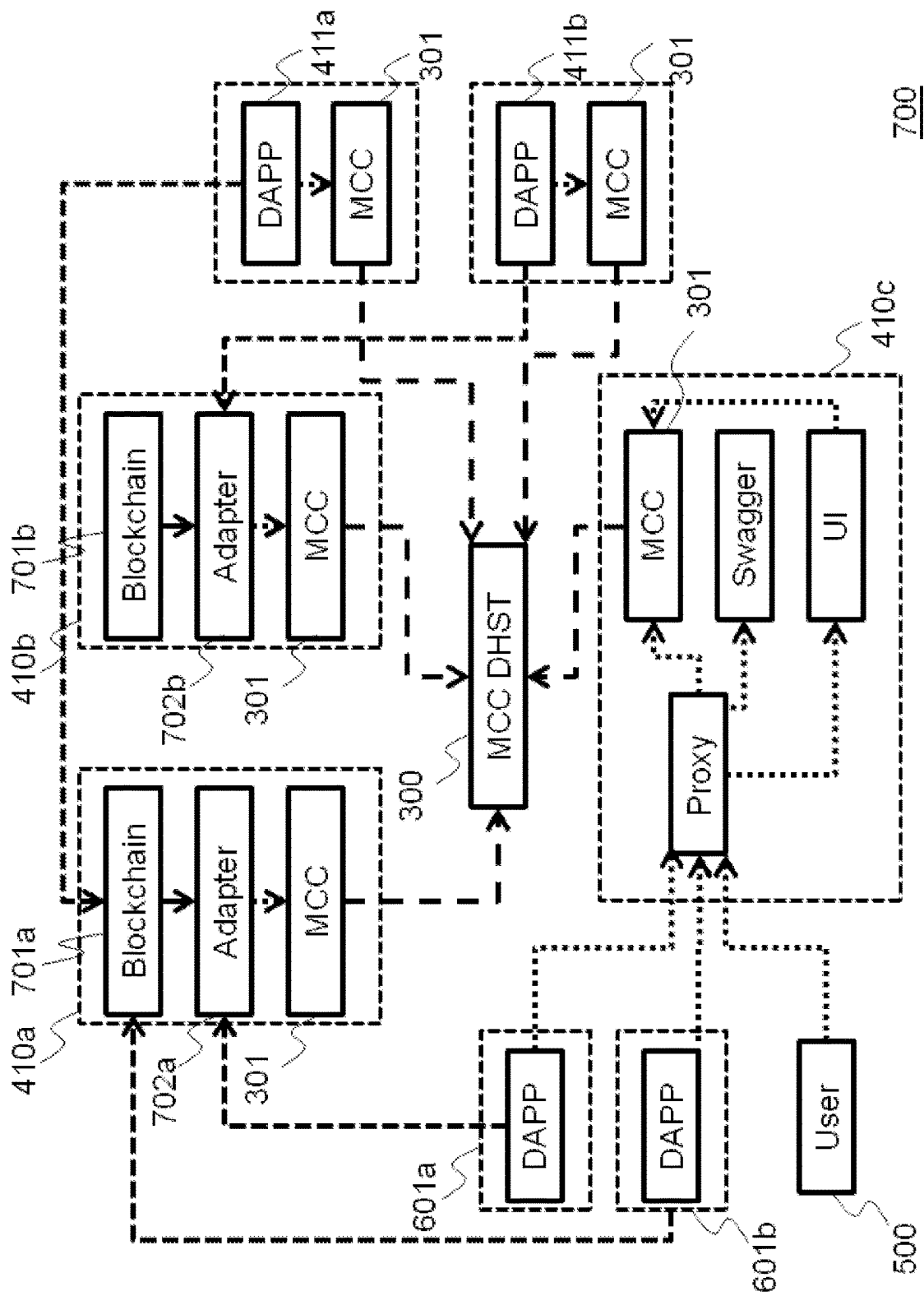
FIG. 1 shows a Mesh Companion Container (MCC) inside a MESH ecosystem according to an embodiment of the invention.

Exemplary embodiments of the invention to provide methods and systems for network service management in a distributed architecture. Exemplary embodiments of the invention further provide methods and systems for service discovery in a distributed architecture. Exemplary embodiments of the invention further provide methods and systems for message relay in a distributed architecture.

According to a first aspect of the invention there is provided a method for distributed service management in a distributed data processing network; wherein the distributed data processing network comprises a plurality of network nodes; wherein the distributed data processing network comprises a distributed service management unit and wherein client nodes and service provider nodes each run an instance of the distributed service management unit. The distributed service management unit comprises a distributed hash set table (DHST) configured to store and retrieve one or more datasets; wherein each dataset comprises a key and one or more values and the DHST is indexed by the key. The distributed management unit is configured to provide an application programming interface (API) and is configured so that all connections between a client node and a service provider node are tunneled through the API. When a service provider registers a service on a network node, this registering network node will store an endpoint of said service in a dataset of the DHST with a key corresponding to said service. When a service is requested by a client node, the distributed service management unit is configured to return all endpoints stored in the DHST with the key corresponding to said service.

In a preferred embodiment of the invention, the endpoint is used as an address to connect to the respective service via the distributed service management unit; and wherein the endpoint is a string comprising information about one or more information about: a protocol used for communication with the service, a network node identifier of the registering network node of the service, and an identifier of the service on the registering network node.

In a preferred embodiment of the invention, the key corresponding to a service is a string that comprises type information about the key and name information of the service; and wherein preferably a hash of the string is used as the key in the DHST, more preferably an SHA-1 hash is used.

In a preferred embodiment of the invention, the API is configured to provide an HTTP tunnel or a transmission control protocol (TCP) tunnel between the client node and the service provider node.

In a preferred embodiment of the invention, insofar as the HTTP protocol is used, when the client node sends a request to an endpoint, the client node sends a request message to the closest network node of the distributed service management unit, wherein the request message comprises the endpoint in a header; and wherein when a node of the distributed service management unit receives a request message with an endpoint in the header it is configured to forward the request message transparently to respective the service provider network node and return the reply message in response to that request message.

In a preferred embodiment of the invention, insofar as the TCP protocol is used, when the client node sends an HTTP CONNECT request message to the distributed service management unit and specifies the endpoint in the header, the distributed service management unit is configured to attempt to establish a two-way connection to said endpoint, and after the connection is established, the distributed service management unit is configured to return a confirmation message, preferably a 200 OK message, after which the connection will be a transparent, two-way, binary link between the client node and the service provider node.

According to the present invention, there is also provided a distributed service management unit for use in a distributed data processing network; wherein the distributed data processing network comprises a plurality of network nodes; wherein client nodes and service provider nodes each run an instance of the distributed service management unit. The distributed service management unit comprises a distributed hash set table (DHST) configured to store and retrieve one or more datasets; wherein each dataset comprises a key and one or more values and the DHST is indexed by the key. The distributed management unit is configured to provide an application programming interface (API) and is configured so that all connections between client node and service provider node are tunneled through the API. When a service provider registers a service on a network node, this registering network node will store an endpoint of said service in a dataset of the DHST with a key corresponding to said service. When a service is requested by a client node the distributed service management unit is configured to return all endpoints stored in the DHST with the key corresponding to said service.

In a preferred embodiment of the invention, the endpoint is used as an address to connect to the respective service via the distributed service management unit; and wherein the endpoint is a string comprising information about one or more information about: a protocol used for communication with the service, a network node identifier of the registering network node of the service, and an identifier of the service on the registering network node.

In a preferred embodiment of the invention, the key corresponding to a service is a string that comprises type information about the key and name information of the service; and wherein preferably a hash of the string is used as the key in the DHST, more preferably a SHA-1 hash is used.

In a preferred embodiment of the invention, the API is configured to provide a HTTP tunnel or a TCP tunnel between the client node and the service provider node.

In a preferred embodiment of the invention, insofar as the HTTP protocol is used, when the client node sends a request to an endpoint, the client node sends a request message to the closest network node of the distributed service management unit, wherein the request message comprises the endpoint in a header; and wherein when a node of the distributed service management unit receives a request message with an endpoint in the header, it is configured to forward the request message transparently to the respective service provider network node and return the reply message in response to that request message.

In a preferred embodiment of the invention, insofar as the TCP protocol is used, when the client node sends an HTTP CONNECT request message to the distributed service management unit and specifies the endpoint in the header, the distributed service management unit is configured to attempt to establish a two-way connection to said endpoint, and after the connection is established, the distributed service management unit is configured to return a confirmation message, preferably a 200 OK message, after which the connection will be a transparent, two-way, binary link between the client node and the service provider node.

According to the present invention, there is also provided a data processing network configured to perform the steps of a method according to an exemplary embodiment.

According to the present invention, there is also provided a computer program comprising instructions which, when the program is executed by a computer, cause the computer to carry out a method according to an exemplary embodiment.

According to the present invention, there is also provided a computer-readable medium comprising instructions which, when executed by a computer, cause the computer to carry out a method according to an exemplary embodiment.

According to another aspect of the invention there is provided a method for storing of at least one dataset in a distributed data processing network, wherein the data processing network comprises a plurality of network nodes; wherein a dataset comprises one or more values and one key; wherein each network node has an address. An address and a key have the same format and are elements of the same data space. Each network node maintains a plurality of lists of close network nodes which are close to a respective key, with respect to a distance metric regarding a respective key and a respective address of a network node. Each network node maintains an internal table of datasets which is indexed by the keys. For storing a value to a dataset, an ADD message is sent from a specific network node to all close network nodes, and the ADD message comprises the key of the dataset and the value to be added. When a close network node receives an ADD message and the key is not known to the close network node, a new dataset is created in the internal table of close network node comprising the key and the value; and wherein when a close network node receives an ADD message and the key is known to the close network node the value is added to the one or more values in the dataset of the key in the internal table of the close network.

In preferred embodiments the term "close node" is used for nodes with an ID close to the key, and close is determined by the distance metric, preferably a bitwise XOR, as will be detailed below.

That is, a message is not sent to the nodes being selected according to a spatial proximity to the current node. A message is also not sent to the nodes selected based on having an ID similar to the ID of the sending node.

Instead, the message, in particular the above ADD message is sent to the nodes which are "close to the key", i.e. with an ID which is close to the key. For example, if the key is 110011, then the nodes with IDs which are similar to the key, such as nodes with the IDs 110010 (XOR distance 000001) or 110110 (XOR distance 000101) will be contacted. However, nodes with very different IDs, such as e.g. 000111 (XOR distance 110100), will not be contacted.

In order to find the closest nodes to the key, preferably first a FIND_NODE procedure, as detailed below is performed, afterwards a message can be sent to the close nodes that were found.

According to another aspect of the invention there is provided a method for retrieval of at least one dataset in a distributed data processing network, wherein the data processing network comprises a plurality of network nodes; wherein a dataset comprises one or more values and one key; wherein each network node has an address; wherein an address and a key have the same format and are elements of the same data space. Each network node maintains a plurality of lists of close network nodes which are close to a respective key, with respect to a distance metric regarding a respective key and a respective address of a network node. Each network node maintains an internal table of datasets which is indexed by the keys. For retrieving the one or more values of a dataset a GET message is sent from a specific node to all close network nodes and the GET message comprises the key; wherein when a close network node receives a GET message the close network node returns its list of close network nodes and if the key is known to the close network node the dataset of the key, preferably the values of the dataset of the key; and wherein the specific node adds the received close nodes to its list of close nodes and adds the received values to a list of values for the key.

In a preferred embodiment of the invention, the specific node repeats the sending of GET messages until all nodes of the list of close nodes have been contacted with a GET message and no further close nodes are returned.

In a preferred embodiment of the invention, the dataset further comprises an expiration time, preferably an expiration time point, for each value; wherein the expiration time is comprised in the ADD message; and wherein each node deletes expired values from the internal table.

In a preferred embodiment of the invention, a node, which has stored a value, restores the value again at a predetermined time, preferably a predetermined time point; and wherein the predetermined time is before the expiration time of the value.

In a preferred embodiment of the invention, a hash of the key is determined and the hash is used instead of the key.

In a preferred embodiment of the invention, the K closest network nodes, with respect to the distance metric, are defined as close network nodes; wherein K is a predetermined number, preferably between 10 and 30, more preferably 20.

In a preferred embodiment of the invention, the distance metric is based on an exclusive or, XOR, applied to the address and key, preferably bitwise.

In a preferred embodiment of the invention, the key is a 160 bit identifier.

According to the present invention, there is also provided a distributed hash set table in a distributed data processing network, wherein a method according to an exemplary embodiment of the invention is used to store and/or retrieve a value to a key.

According to the present invention, there is also provided a node of a data processing network configured to execute a method according to an exemplary embodiment of the invention.

According to the present invention, there is also provided a data processing network comprising at least two of the preceding nodes.

According to the present invention, there is also provided a computer program comprising instructions which, when the program is executed by a computer, cause the computer to carry out a method according to an exemplary embodiment of the invention.

According to the present invention, there is also provided a computer-readable medium comprising instructions which, when executed by a computer, cause the computer to carry out a method according to an exemplary embodiment of the invention.

According to another aspect of the invention there is provided a method for transport of messages from a sending network node to a receiving network node and for the transport of a reply message from the receiving network node to the sender network node in a distributed data processing network. The distributed data processing network comprises a plurality of network nodes. Each message comprises relay-flag information and source address information. Each receiving network node is configured to send an acknowledgement message in response to every message received. The source address information is the address of the sending network node. The relay-flag information comprises one of: a first value, a second value, and a third value. When the relay-flag information is set to the first value, the message is sent directly from the sending network node to the receiving network node and the acknowledgement message is sent directly from the receiving network node to the sending network node. When the relay-flag information is set to the second value, the message is relayed from the sending node via a third network node to the receiving network node and the acknowledgement message is sent directly from the receiving network node to the sending network node. When the relay flag information is set to the third value, the message is relayed from the sending network node via a third network node to the receiving network node and the acknowledgement message is relayed from the receiving network node via the third network node to the sending network node. The third network node is determined by the distributed data processing network.

In a preferred embodiment of the invention, the sending network node determines whether the receiving network node is directly reachable; in case the receiving network node is directly reachable, the message is sent from the sending network node with the relay flag information being set to the first value and the receiving network node is tagged as directly reachable; in case the receiving network node is not directly reachable, the message is sent from the sending network node with the relay flag information being set to the second value; and if no acknowledgement message is received by the sending network node after a predetermined period, the previous step is repeated a predetermined number of times.

In a preferred embodiment of the invention, each respective network node maintains a first list of network nodes known to the respective network node; wherein each respective network node maintains a second list of network nodes to which the respective network node has been in contact with in the network within a predetermined period of time; wherein when no acknowledgement message is received by the sending network node in the last repetition of sending the message with the relay flag information set the first value, the sending network node queries the network nodes of the first list of the sending network node whether or not said respective network nodes have the receiving network node on their respective second list; wherein when a respective network node has the receiving network node on the respective network node's respective second list, the respective network node is set as the third network node for relay and the message is sent from the sending network node with the relay-flag information set to the second value; and if no acknowledgement message is received by the sending network node after a predetermined period, the previous step is repeated a predetermined number of times.

In a preferred embodiment of the invention, when an acknowledgement message is received by the sending network node, the sending network node tags the receiving network node as directly reachable; wherein when no acknowledgement message is received by the sending network node in the last repetition of sending the message with the relay flag information set the second value, the message is sent from the sending network node with the relay-flag information being set to the third value; and if no acknowledgement message is received by the sending network node after a predetermined period, the previous step is repeated a predetermined number of times.

In other words, if a node is reached without a relay, it is tagged as directly reachable; if a node is reached through a relay, is tagged as indirectly reachable; and if a node is not reached, then it is tagged as unreachable.

In a preferred embodiment of the invention, when an acknowledgement message is received by the sending network node, the sending network node tags the receiving network node as indirectly reachable; and wherein when no acknowledgement message is received by the sending network node, the sending network node tags the receiving network node as not reachable.

In a preferred embodiment of the invention, the predetermined period for a repetition with the relay flag information set to the first value or the second value is smaller than the predetermined period for a repetition with the relay flag information set to the third value.

In a preferred embodiment of the invention, the predetermined period for a repetition with the relay flag information set to the first value or the second value is 200 ms and/or the predetermined period for a repetition with the relay flag information set to the third value is 500 ms.

In a preferred embodiment of the invention, the predetermined time period for a network node to be on a second list is 60 seconds.

In a preferred embodiment of the invention, the predetermined number of repetitions with the relay flag information set to the first value, the second value, or the third value is two.

According to the present invention, there is also provided a sending network node configured to perform steps of a method according to an exemplary embodiment.

According to the present invention, there is also provided a receiving network node configured to perform steps of a method according to an exemplary embodiment.

According to the present invention, there is also provided a third network node configured to perform steps of a method according to an exemplary embodiment.

According to the present invention, there is also provided a data processing network comprising at least one said sending network node and at least one said receiving network node, and preferably at least one said third network node.

According to the present invention, there is also provided a computer program comprising instructions which, when the program is executed by a computer, cause the computer to carry out a method according to an exemplary embodiment.

According to the present invention, there is also provided a computer-readable medium comprising instructions which, when executed by a computer, cause the computer to carry out a method according to an exemplary embodiment.

I. Mesh Companion Container

Exemplary embodiments of the invention provide a Mesh Companion Container (MCC) for the creation and deployment of distributed architectures. The MCC is a computer implemented system in a data processing network. That is the MCC is formed of nodes of the data processing network, wherein each node runs an instance of the MCC. MCC nodes may perform different roles in the MCC at a certain time. The roles may change depending on the processing task.

According to the invention the MCC provides two basic services:

Service Discovery

In an embodiment of the invention, service providers can register their services in the MCC network and then clients, i.e. MCC nodes in a client role, can query the service, from any node of the network. The service discovery allows many providers to register for any given service, thus allowing redundancy and load-balancing between services.

Tunneling

In an embodiment of the invention, in order to simplify connectivity to services, no matter if they are behind a Network address translation, NAT, a firewall and/or other network configurations, the MCC provides an HTTP-level tunnel to access services. This way, clients can send their requests to the MCC network and the request will be routed to its destination, independently of where the source of the request and destination are within the network.

In a preferred embodiment, the MCC is implemented itself as a decentralized and distributed network. The MCC is preferably based on a Distributed Hash Table (DHT), more preferably based on a Kademlia DHT, with a number of extensions as described below.

In an exemplary embodiment, in a MESH ecosystem, the MCC is a communication enabler. The MCC allows for adapters and blockchain nodes to be deployed anywhere in the network, while always keeping connectivity to the core services, such as an Application Programming Interface (API), or a User Interface (UI).

It is an advantage of the invention that adapters and blockchain nodes can be located and be accessible anywhere in the network, even behind NATs. As a result, there is no need to deploy everything, i.e. every service, on the same node.

It is a further advantage of the invention that since the service discovery allows more than one provider per service, it is very easy to add load balancing and redundancy mechanisms for a service.

It is still a further advantage of the invention that the MCC also allows more advanced setups. For example, a client application could directly access a blockchain node bypassing the API of the MCC, by opening a direct tunnel to that service.

FIG. 1 shows an MCC inside a MESH ecosystem 700 with a user 500 according to an embodiment of the invention. The core of the system is the MCC service 300. The MCC service 300 is preferably implemented as a distributed service. That is, preferably the service is provided in the form of a distributed data processing network with at least two MCC nodes 301.

In this description the term "node" is, unless indicated otherwise or contradicted by context, used with respect to a functionality of a processing node. That is a physical computing unit may comprise, i.e. host, one or more node. Accordingly, multiple nodes may form the data processing network according to embodiments of the invention, although they are physically executed on the same computing unit.

In other words, the term node refers to a node of a network; however, it does not necessarily correspond to a physical computing unit.

In the MESH ecosystem MCC nodes 301 are provided at all instances of the network which require access to distributed services. In detail, MCC nodes 301 are provided at each MESH node 410*a*, 410*b*; at every node of a distributed app (DAPP) 411*a*, 411*b*; at a MESH master node 410*c*. DAPPs without an MCC node 601*a*, 601*b* may access the MESH blockchains 701*a*, 701*b* and/or adapters 702*a*, 702*b* via a tunnel and/or via a proxy access to the MCC node 301 of the MESH master node 401*c*.

In FIG. 1 http connections are indicated as dotted line arrows; User Data Protocol (UDP)/Protobuf connections are indicated as long dashed line arrows; tunnel connections are indicated as short dashed line arrows; and Blockchain remote procedure call (RPC)/API connections are indicated as solid line arrows.

II. Distributed Hash Table

Distributed Hash Tables (DHT) is a technology that allows for storing data in the form of a key/value tuple over a group of nodes, i.e. devices. Distributed Hash Tables work as a kind of dictionary; each word, i.e. the key, corresponds to a definition, i.e. the value. There are a number of techniques to build a DHT. DHTs are designed to be scalable, fault-tolerant and self-organizing. Examples of such DHTs are content addressable network (CAN), Chord, Pastry, Tapestry, and Kademlia.

Every DHT defines a method to store a value in a cluster of nodes, and a way to later retrieve said value. DHTs may internally work in different ways. The following papers, which are incorporated hereby reference, provide a technical description of some of the most popular DHTs:

[Ref1]: CAN: Ratnasamy et al., "A Scalable Content-Addressable Network," SIGCOMM'01, Aug. 27-31, 2001, accessible at https://people.eecs.berkeley.edu/~sylvia/papers/cans.pdf

[Ref2]: Chord: Stoica et al., "Chord: A Scalable Peer-to-peer Lookup Service for Internet Applications," SIGCOMM'01, Aug. 27-31, 2001, accessible at https://pdos.csail.mit.edu/papers/chord:sigcomm01/chord_sigcomm.pdf

[Ref3]: Pastry: Rowstron et al., "Pastry: Scalable, decentralized object location and routing for large-scale peer-to-peer systems," $18^{th}$ IFIP/ACM International Conference on Distributed Systems Platforms (Middleware 2001), accessible at http://rowstron.azurewebsites.net/PAST/pastry.pdf

[Ref4]: Tapestry: Zhao et al., "Tapestry: A Resilient Global-Scale Overlay for Service Deployment," IEEE Journal on Selected Areas in Communications, Vol. 22, No. 1, January 2004, accessible at https://pdos.csail.mit.edu/~strib/docs/tapestry/tapestry_jsac03.pdf

[Ref 5]: Kademlia: Maymounkov et al., "Kademlia: A Peer-to-peer Information System Based on the XOR Metric," accessible at https://pdos.csail.mit.edu/~petar/papers/maymounkov-kademlia-lncs.pdf It is acknowledged that the definitions of terms relating to blockchain technology have not yet been standardized; therefore, the same terms may be used to describe different features in the state of the art and also different terms may be used to describe the same feature. As much as possible, this description aims to use the same terms in a manner that is consistent with the above-identified documents.

II. 1 Problems of a DHT in a Distributed Architecture

Figure 2A:
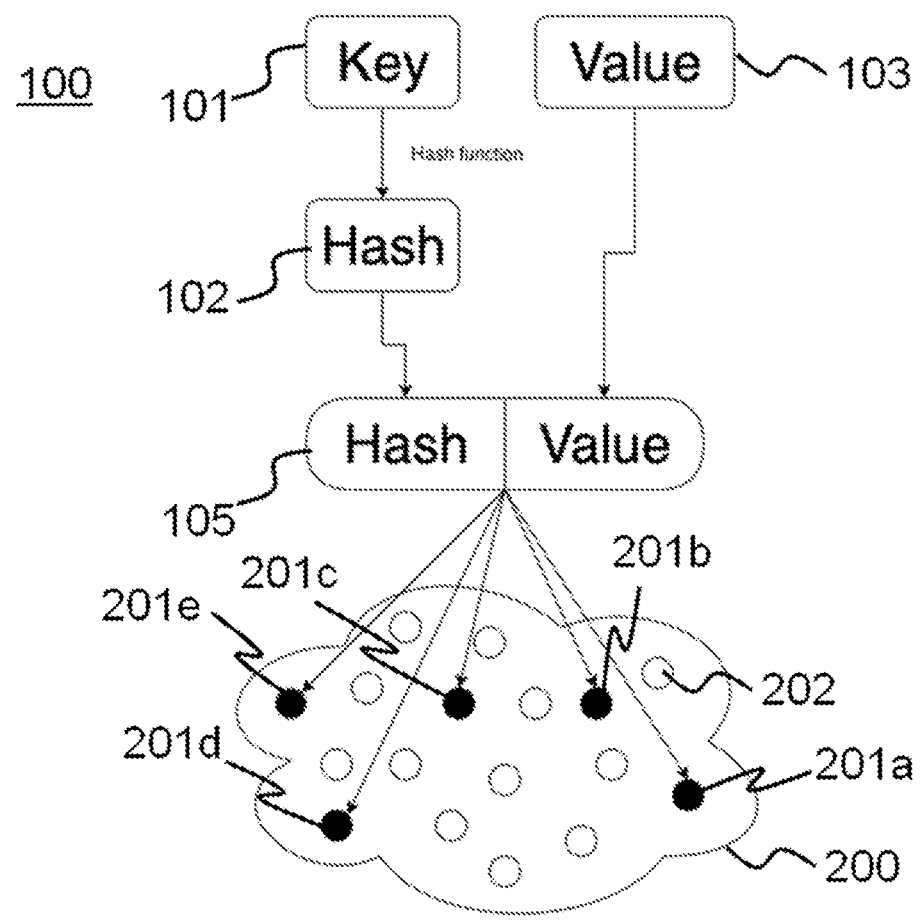
FIG. 2a shows an embodiment of an exemplary distributed hash table.

FIG. 2*a* shows an embodiment of an exemplary distributed hash table. This example discusses the basic functionality of a DHT service 100, also referred to as DHT 100, in particular based on the Kademlia DHT. The DHT 100 is implemented as a distributed service in a data processing network 200. The data processing network comprises nodes 201 and 202.

A DHT 100 may operate as follows: for any given key 101, they can locate a node 201 or a group of nodes 201a, 201b, 201c, 201d, 201e in the data processing network 200 which stores a value 103 corresponding to said key 101, thus a DHT 100 allows for efficient storage and retrieval of data in an arbitrarily big group of nodes 200.

In order to store a key/value tuple 105, the key 101 is preferably hashed using a hashing function to calculate a hash 102 of said key 101. It is noted that hashing is not necessary, but preferred. Subsequently the DHT 100 may locate specific nodes 201 which should store that hash 102. And finally the hash/value tuple 103 is stored in said selected nodes 201 of the data processing network 200.

To retrieve a value 103 associated with a key 101, the same procedure is followed. First the key 101 is hashed. Again this only applies if the key 101 was hashed in the storing operation. Subsequently, the DHT 100 locates the specific nodes 201 that should contain the received hash 102, and finally those specific nodes 201 are contacted to retrieve the value 103 associated with the hash 102.

To achieve this, the DHT 100 has an addressing mechanism that is configured to determine nodes 201, which nodes should contain a specific key.

It is noted that, in DHT literature, the hash or hashed key is normally referred to simply as the key, since technically DHTs do not require the key to be hashed, but they usually are. Therefore, it will be referred to herein as the key.

Distance and Closest Nodes

In Kademlia every node has a random ID, preferably a 160-bit ID. Kademlia then defines a distance. The distance measure is used to determine which IDs are close and which IDs are far from each other. The distance function used in Kademlia is a bitwise exclusive or, XOR function applied to the respective ID of two nodes.

The smaller the result of XORing the IDs of two nodes, the closer the nodes are to each other. In other words, the distance in a DHT is a distance between node IDs.

Figure 2B:
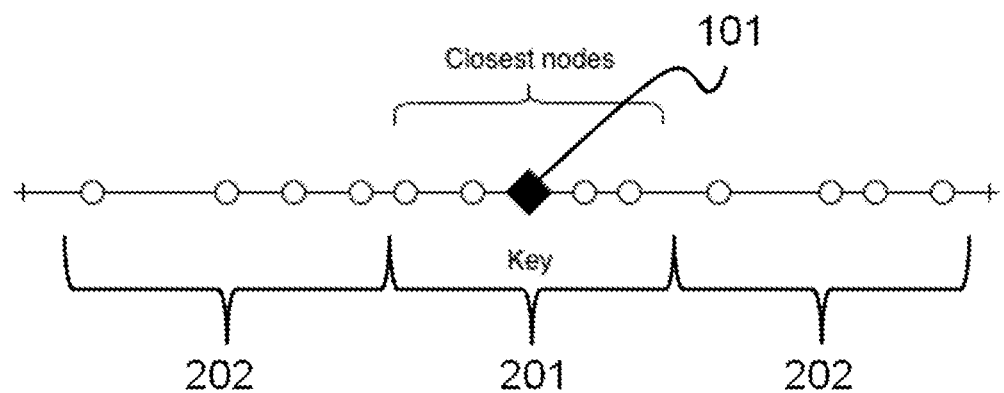
FIG. 2b shows the concept of closest nodes in a distributed hash set table (DHST) according to an embodiment of the invention.

FIG. 2b shows the concept of closest nodes in a DHT according to an embodiment of the invention. Keys in a DHT 100 have preferably the same format as node IDs and live in the same address space. That is, node IDs and keys can be subjected to the same distance calculation.

Therefore, all that the DHT does is determine the nodes 201 out of the nodes 201, 202 of the network 200 whose ID is closest to a given key 101. The closest nodes 201 are thus the nodes where the distance between the node IDs and the key 101 is the possible minimum.

If, as shown in FIG. 2b, the address space is represented as a straight line, ordered by XOR distance, the closest nodes 201 would be the ones which are next to the key 101.

In order to determine the closest nodes 201 to any given key 101, the DHT 100 on a specific node preferably keeps a table of nodes, also known as k-buckets, ordered by the XOR distance between the other node's ID and the specific node's own ID.

When the DHT 100 on said specific node wants to store or retrieve a value, it goes to the k-bucket whose distance matches the distance between the specific node's ID and the key. For example, if the key to be stored has a XOR distance of 5 to the specific node, the specific node will go to the k-bucket number 5 and ask the nodes in said k-bucket there if a node knows a node that is even closer.

This is due to a property of the XOR function, that A XOR C is smaller than (or equal to) A XOR B plus B XOR C.

The process of finding the closest nodes to a key process of a DHT 100 and is controlled by the initiating node, that is, the node that is performing the search.

Unlike other P2P technologies, nodes according to the invention do not forward messages to their peers. Instead, nodes return a list of other nodes that they know that are closer to the desired address, i.e. ID or key. According to the invention, the initiating node will continue to ask these other nodes until there are no more nodes to ask.

Figure 2C:
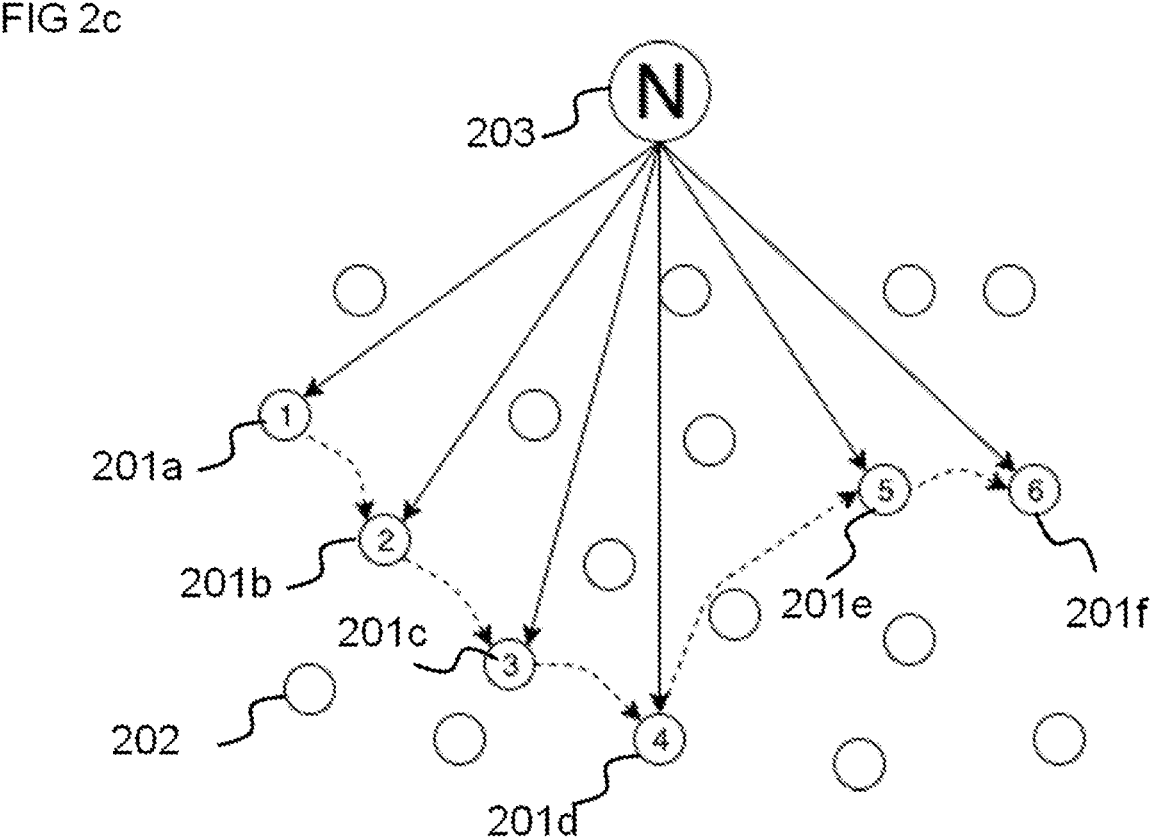
FIG. 2c illustrates the search for a closest node in a DHST according to an embodiment of the invention.

FIG. 2c illustrates the search for a closest node in a DHT according to an embodiment of the invention. The initiating node "N" 203 asks first to the node number "1" 201a, which points it to number "2" 201b. N then asks to node 201b, and this node points "N" to node number "3" 201c, and so on. The process continues until "N" finds a node that contains the key or "N" cannot find any node that is closer to the desired key.

This process is used to find the group of nodes 201 to write/read a key from, but also it is also used to locate a single node with a specific key, thus the process also corresponds to a network addressing mechanism.

DHTs generally only provide a way to retrieve one and only one value per key. There is no native way to store a list or a set of values on existing DHTs. Furthermore, the retrieval methods that exist do not guarantee complete reliability when retrieving a key.

This limitation makes the implementation of many potential use cases on a DHT extremely complex and limits the usability of the technology. Examples of uses cases that would greatly benefit from such a feature would be distributed and censor resistant chat applications, distributed service discovery, distributed load balancing, etc.

It is an advantage of the invention to provide a reliable way to store and retrieve sets of elements. The invention also provides a way for values to expire and be automatically removed from the DHT, thus preventing the DHT to become cluttered with old or useless data.

III. Mesh Companion Container and Distributed Hash Table

In an embodiment of the invention, the MCC is based on a Distributed Hash Table. As discussed above DHT is simply a key-value store that instead of storing all keys in the memory of a single node, it uses a deterministic algorithm to spread it across a number of nodes. This way, keys can be always retrieved, no matter where in the network they are stored.

As discussed above, there are many DHT implementations and in a preferred embodiment of the invention Kademlia is the underlying DHT technology. However, it is also noted that the invention is not limited to a specific implementation of a DHT.

Kademlia defines a 1-to-1, i.e. key-to-value lookup process, as specified by [Ref5].

In an exemplary embodiment, the invention provides 1-to-many discovery, i.e. a key-to-set of values, so that many providers can be registered for the same service, allowing for fault-tolerance and scalability.

In order to achieve this, the present invention provides an extension to the DHT protocol, preferably the Kademlia protocol.

In an embodiment of the invention, the MCC exposes a REpresentational State Transfer (REST) API for Apps and the Service Providers to use.

In an embodiment of the invention, the MCC nodes talk to each other using a custom Protocol Buffers (Protobuf)-based User Datagram Protocol (UDP) protocol.

In an embodiment of the invention, the DHT acts as a network and storage layer for the MCC.

IV. Extension of Distributed Hash Table: Distributed Hash Set Table

As discussed above, Distributed Hash Tables and hash tables in general work as a dictionary—one key corresponds to one value. If a value is written using a key that already exists in a DHT, the new value will replace the old one. There is no way to have more than one value for any given key in a conventional DHT.

Embodiments of the invention are preferably based on a Kademlia DHT and provide a number of extensions to allow for multi-value storage and value expiration. Thus the extended DHT is referred to as Distributed Hash Set Table (DHST).

The DHST according to the invention allows for a key to have multiple values. Every time a new value is written to an existing key, it does not replace the old values; instead, it is added to an unordered list, i.e. a set, containing all previous values.

Sets, i.e. unordered lists, and not ordered lists are used because the unpredictable order in which values are stored and retrieved makes it impossible to guarantee that all items will be returned in a specified order.

The DHST according to the invention is implemented as an extension to Kademlia. This is done by removing the STORE message function and adding a new ADD message function. ADD appends a value to the set of the given key instead of replacing it.

Regarding lookups a regular DHT and the DHST according to the invention work exactly the same way, except that the DHST does not stop when it finds the first value, instead, it continues querying all close nodes to make sure all values have been retrieved.

Moreover, according to the invention each value has its own expiration date, which means that each value may expire at different times.

In an embodiment of the invention, the DHST assigns each node a unique identifier, preferably a 160-bit identifier. Keys are then turned into strings, preferably 160-bit strings, using a hash function. This way, to store a value, the DHST simply finds the K nodes whose ID is closest to the key's hash and stores the value there. K is a constant. In a preferred embodiment K is defined to be 20.

It is noted that nodes can store different values. In order to guarantee that all the possible values have been retrieved, unlike Kademlia, the DHST, according to the invention, does not stop when it finds a first value; instead it will preferably continue visiting all closest nodes to the key, until all values have been retrieved.

Figure 3A:
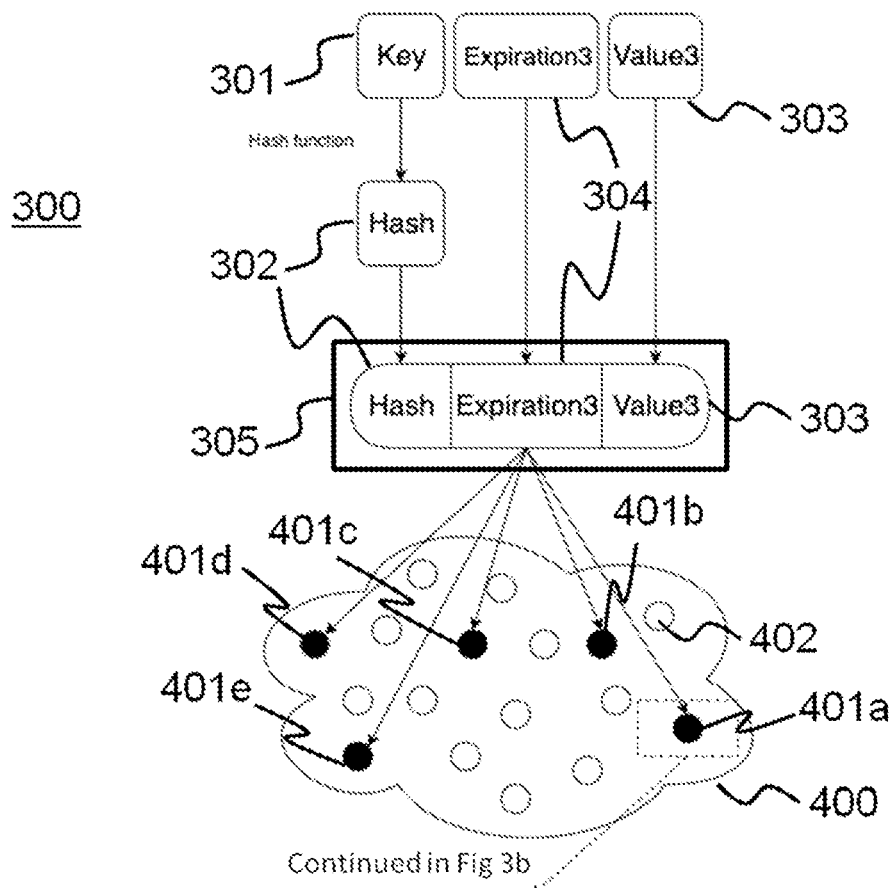
FIG. 3a shows a DHST according to an embodiment of the invention.
Figure 3B:
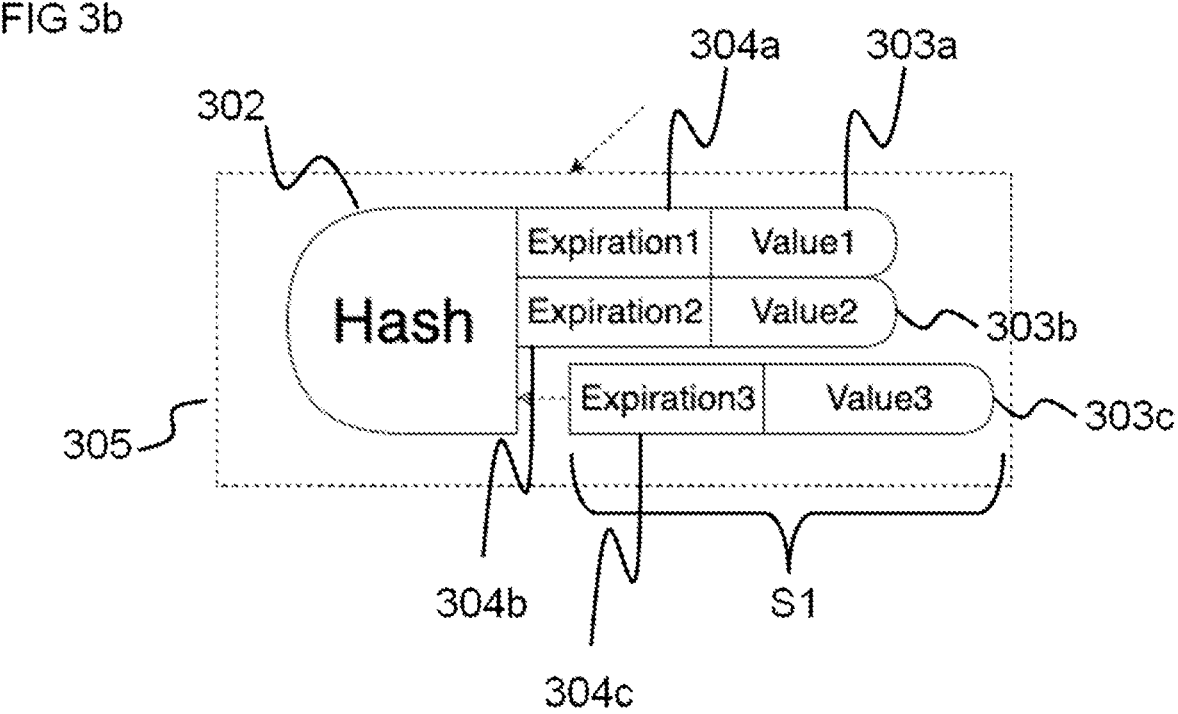
FIG. 3b shows an entry of a DHST according to an embodiment of the invention.

FIG. 3a shows a DHST according to an embodiment of the invention. FIG. 3b shows an entry of a DHST according to an embodiment of the invention. As discussed above the DHST service 300 is also provided as a distributed service in a data processing network 400. Instead of a key/value tuple a key/expiration/value tuple 305 is stored. In fact, in a preferred embodiment, for one hash 302, i.e. one key 301, a plurality expiration points, also referred to as expiration 304a, 304b, and 304c and also a plurality of values 303a, 303b, 303c are comprised in one entry 305 of the DHST.

With reference to FIG. 3a, as discussed above the key 301 is preferably hashed with a hash function and a hash 302 is received. The hash 302, a corresponding expiration 304, and a corresponding value 303 is then sent to closest nodes 401a, 401b, 401c, 401d, 401e in the network 400. The network 400 may comprise further nodes 402 which are not closest nodes.

With reference to FIG. 3b, in one of the closest nodes 401a, 401b, 401c, 401d, 401e in a step S1 the expiration 304 and value 305 are added to the entry of hash 302. This entry 305 may already comprise further expiration/value tuples for the same hash 302.

DHST and Kademlia Actions

Kademlia defines four actions, the paper calls them Remote Procedure Call (RPCs): PING, STORE, FIND_NODE, and FIND_VALUE.

In an exemplary embodiment, the protocol is implemented as defined in [Ref5] with two modifications:
a) STORE is replaced by ADD and
b) FIND_VALUE is replaced by GET.

The ADD and GET functions according to embodiments of the invention will be explained in detail below.

IV.1 ADD

In a preferred embodiment of the invention, an ADD function of the DHST 300 adds a value 303 and expiration 304 to a set for a respective key 301, i.e. hash 302, on a node of the data processing network 400. If the key or hash is not known in said node, i.e. the key or hash is not found in the node's internal hash table, a new set with only this value will be created, otherwise the value will be appended to the set corresponding to that key.

In a preferred embodiment of the invention, an expiration point is specified for each value when added, which will also be stored in the internal hash table of the node, together with the value. Preferably, the expiration point is a predetermined time point, and said predetermined time point is preferably less than 24 h after the ADD.

In a distributed network, there are many unknowns; nodes can be in different networks, in different countries, nodes can be configured in different ways and so on. For this reason it is important to share only information that is somewhat guaranteed to be the same everywhere.

One example of this is the use of expiration time points vs. duration times. To specify an expiration, it disadvantageous to use a predetermined duration, that is, a relative deadline, for example in 10 seconds from now, i.e. the time of ADD. This is due to the fact that the information about the deadline may take time to reach all nodes, and if nodes start counting the 10 seconds from the time they received the deadline, they may end up with different deadlines within the network 400.

For this reason in an embodiment of the invention, an absolute date, i.e. a point of time, as the deadline is used. In a preferred embodiment a time to live (TTL) point is used. It is true that even absolute dates are not infallible; for example, the nodes' clocks may not be synchronized, but absolute dates are much more likely to be the same across nodes than relative ones.

In an embodiment of the invention, if an identical value already exists in the set for a respective key, the expiration time is updated.

IV.2 GET

In a preferred embodiment of the invention, a GET function retrieves the set of values 303a, 303b, 303c, of a respective key or hash 302. In response to a GET, a node returns a list of nodes which are closer to this key, i.e. node ID, and if the node knows this key or hash, it will also return the corresponding set of values along with the list of closer nodes.

This is different than the FIND_VALUE function as defined by Kademlia as the GET will always return a list with the closer nodes to the key. Also, unlike FIND_VALUE, the GET doesn't stop when it retrieves a first value, and instead it keeps querying nodes until there are no more nodes close to the key to query.

IV.3 Storing and Retrieving a Key/Value in a DHST

Storing

In an embodiment of the invention, storing a value 303 for a key works differently from Kademlia. As mentioned above, every time a node 401 receives an ADD message, the received value 303 is combined to the existing set and not replaced, cf. FIG. 3*b*.

In an embodiment of the invention, in the DHST, values are stored in the memory of a node of the data processing network 400 in an internal hash table. The internal hash table is indexed using the DHST's keys, which similar to Kademlia, are equivalent to the node IDs. Each entry in the internal hash table contains a set of values, i.e. one or more values, and preferably a corresponding number of expiration points. In a preferred embodiment, values cannot be repeated. Thus, in the same key there could be different values each with different expiration times.

After a value expires, said value is deleted from the hash table. When multiple values with different expiration times exist for a single key, only the expired values are deleted; the rest and the key itself will remain in the hash table of the node.

Retrieve

In an embodiment of the invention, the way to retrieve a key is different from Kademlia. The Kademlia protocol defines an iterative algorithm that stops after a first node returns a value. The DHST instead will continue querying all nodes until there are no closer nodes found.

Every value which is retrieved will be combined to the other previously retrieved values. This way it is guaranteed that all the values for a given key are found. It is noted that in a distributed architecture it is possible that a node does not have the entire set of values but just a subset. This has a disadvantage in the lookup performance but yields more reliable results.

In a preferred embodiment of the invention, keys are the SHA-1 hash of the key name. Also, keys are prepended by the type of data which is stored using the format type/name. Since the hash is case-sensitive, it is preferred to always use lowercase for key names, to prevent ambiguities.

Figure 4:
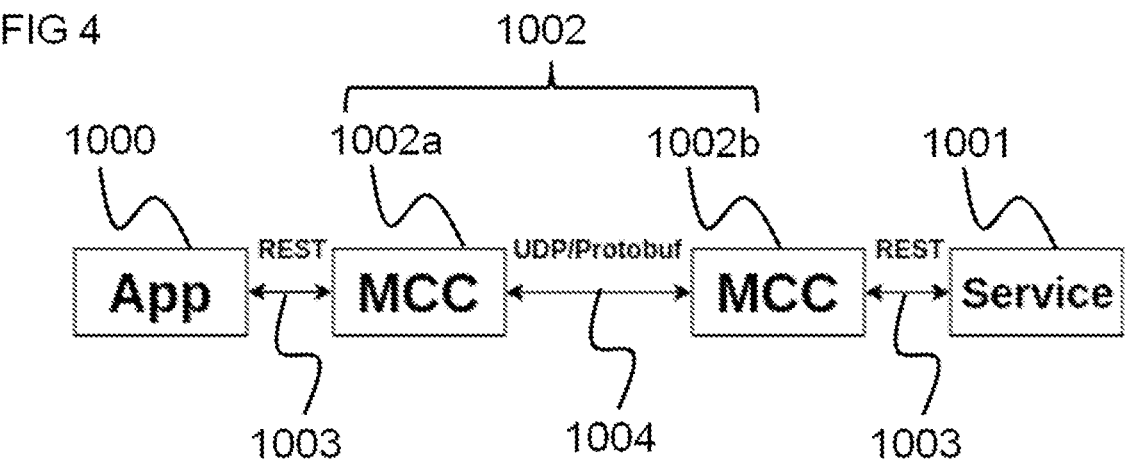
FIG. 4 shows MCC protocols according to an embodiment of the invention.

FIG. 4 shows the MCC protocols according to an embodiment of the invention. In detail, the figure describes the way an App 1000 or a client can talk to a service 1001 using MCC 1002. The App 1000 uses a REST API 1003 to request the MCC 1002*a* of the App or client to open a tunnel to the service 1001. The MCC 1002*a* in turn uses its own UDP-based protocol 1004 to communicate to the MCC node 1002*b* of the service. This MCC node 1002*b* in turn converts the messages from UDP 1004 to HTTP/REST 1003 to communicate to the target service 1001. This way the MCC 1002 is seen as an HTTP proxy from the App 1000 and the service 1001 perspective, although internally it uses its own custom protocol 1004.

Figure 5:
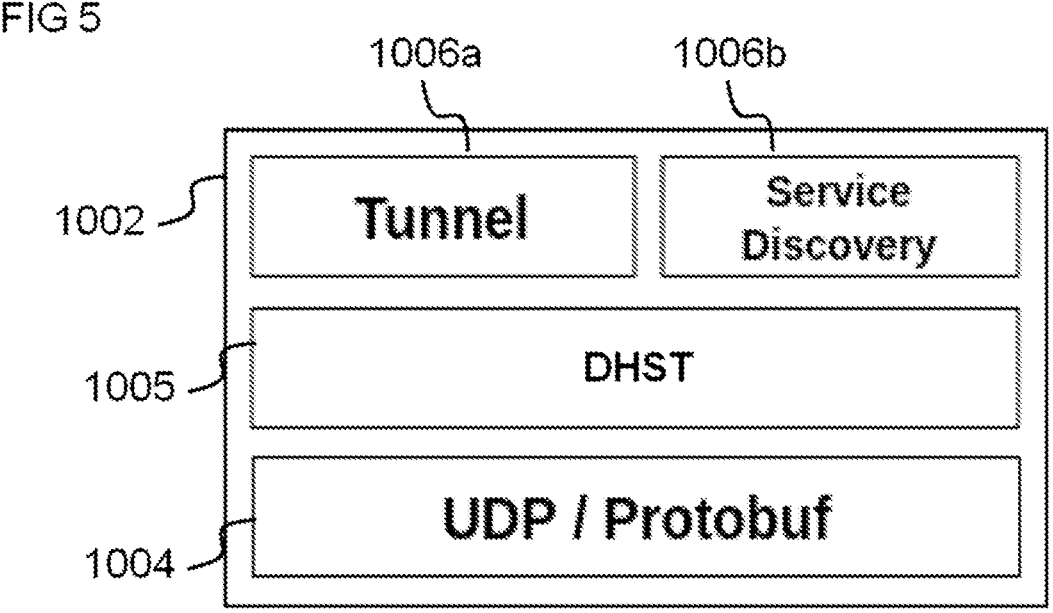
FIG. 5 shows an MCC stack according to an embodiment of the invention.

FIG. 5 shows the MCC stack 1002 according to an embodiment of the invention. In detail, FIG. 5 describes the MCC stack 1002. In a similar way to a TCP/IP stack, MCC 1002 employs a layered approach. The bottom layer is the MCC UDP protocol 1004, which is used as the low level transport for all MCC messages, this layer provides low-level inter-node communication to the upper layers. On top of the bottom layer the MCC comprises a DHST 1005, and the DHST 1005 layer provides storage and routing logic to the upper layers. Finally, on the top layer the MCC 1002 comprises the tunneling 1006*a* and service discovery 1006*b* services.

Figure 6:
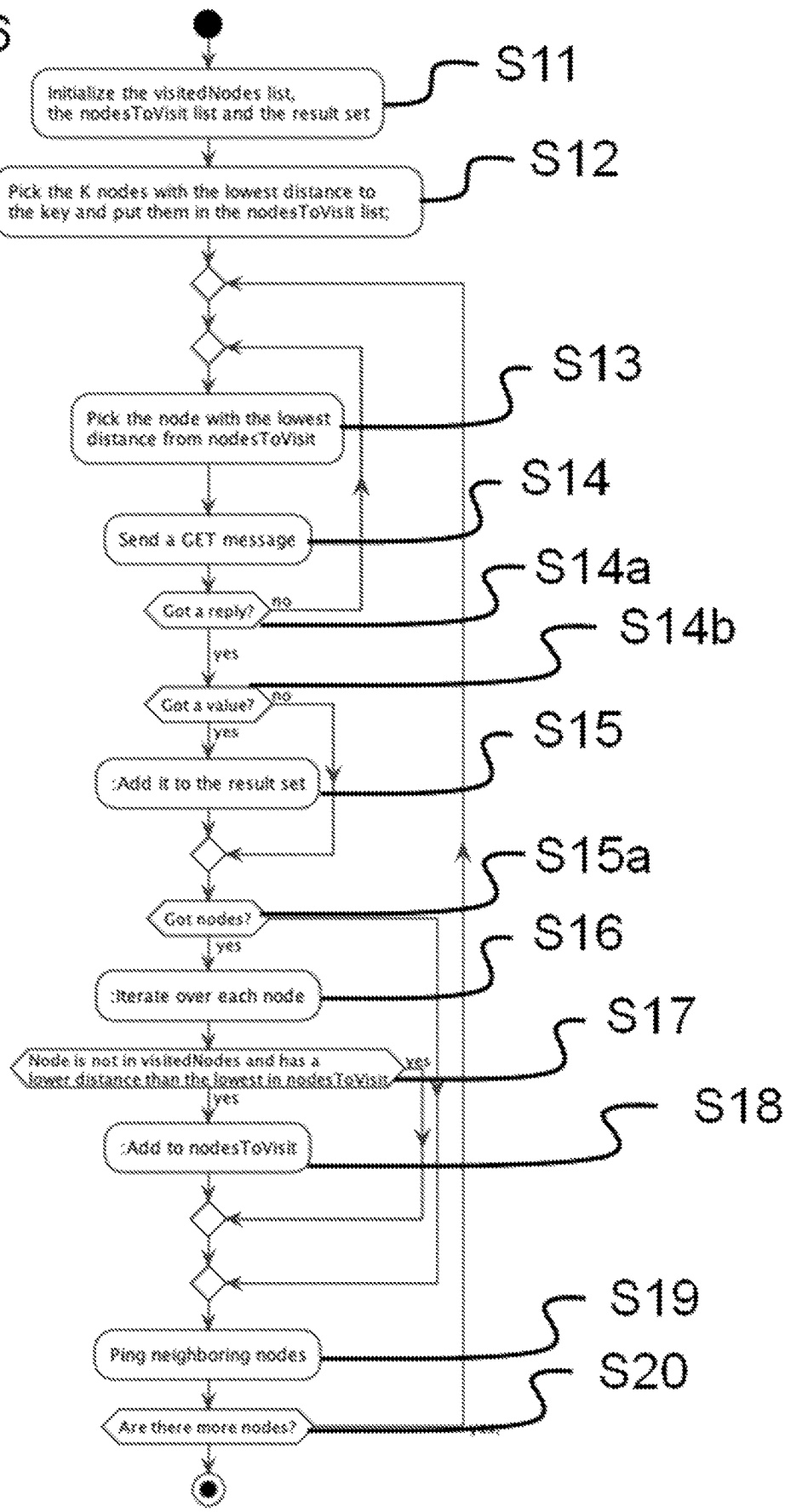
FIG. 6 shows a search algorithm according to an embodiment of the invention.

FIG. 6 shows search algorithm according to an embodiment of the invention.

In a step S11 a list of all visited nodes, visitedNodes, is initialized. Furthermore, a list with nodes to visit, nodesToVisit, is initialized. Subsequently, in step S12 the K nodes are determined with the lowest distance to the key are determined and added to the nodesToVisit list. Step 13 determines the node with the lowest distance from the nodesToVisit list and sends a GET message to said node in step S14. In case no reply is received S14*a* step S13 is repeated. In case a reply is received and at least one value is comprised in the reply message S14*b* the at least one value is added to a result list S15. In case a reply is received and no value is comprised in the reply message S14*b* it is proceeded with step S15*a*. In case the reply comprises nodes in steps S16, S17, and S18 it is iterated over each received node, whether or not said node is not on the visitedNodes list, and has a lower distance than the lowest node in nodesToVisit and it is determined on whether or not to include said node on the nodesToVisit list in S18. In case no nodes are received or no further node is included on the nodesToVisit, the neighbouring nodes are pinged S19. In case there are more nodes found in S20 step S13 is repeated. In case no more nodes are found in S20 the search for values is ended.

IV.4 Refreshing Values

In a preferred embodiment of the invention, once a value is added, the node where this value is published will republish the value after certain predetermined time point, preferably 24 h from the publishing time. On any other node said value will be deleted after its respective expiration time point, preferably 25 h, i.e. larger than the predetermined republish time point. Therefore if the node where the value was published goes down, the value will disappear after the predetermined expiration time point, because it is not republished. An expiration time point can be set when a value is published so the value will expire after that time and will be deleted in every node 401 of the data processing network 400.

V. Service Discovery

In the networking world, it is common practice to use a service discovery service to register an address of nodes that provide a given service. For example, such a service discovery service is used in large enterprise clusters where different nodes could be running a given service at any given time.

In a distributed network, service discovery becomes even more important since services may run on nodes which are located in completely different networks and/or are spread across the world, thus having no way to know which nodes are providing which service at any given time.

There are already a number of distributed service discovery technologies, such as Consul and Eureka, and there are even DHT based service discovery technologies such as ReDiR.

However, with the emergence of blockchain, there is a growing need for service discovery and load balancing technologies that can work natively with a distributed network like a blockchain.

Traditional service discovery technologies are single-tenant and datacenter oriented and simply do not work with a distributed network like a blockchain. The blockchain is inherently multi-tenant, as many users and organizations share the same network and run it collaboratively. Conventional technology does not fulfill this need.

In an exemplary embodiment, in order to achieve scalability and decentralization, a DHST is used for service discovery. In the DHST the key-set storage function is of advantage, because in a distributed architecture one service can have several providers.

The DHST is a core part of a Mesh Companion Container (MCC) as described above. The term MCC is used to refer to an MCC node as well as to the service and/or protocol, depending on context.

In an embodiment of the invention, an MCC provides an HTTP API so that all connections are tunneled, cf. section VI, below through it. This way, applications which want to use the MCC do not need to implement any complex protocol to interact with the MCC. Most applications will therefore need no or almost no modification to be compatible with MCC.

In an exemplary embodiment, the MCC works as a transport layer between clients and service providers inside the network. MCC uses the so called "sidecar" pattern, in which both the clients and the service providers should be running instances of MCC to enable connectivity.

In an exemplary embodiment, besides acting as a proxy, MCC also performs load-balancing.

In an embodiment of the invention, the load is evenly distributed through the different providers of a given service, no matters where they are. By doing this, MCC is effectively providing a completely decentralized, global, service mesh.

The service discovery according to an embodiment of the invention runs on top of the DHST. Whenever a new provider registers a service, the node of the provider will go to the DHST and write the service in the corresponding keys.

To register a new service in the network, clients send a PUT request to /services/serviceName to the MCC's HTTP API, preferably with a JavaScript Object Notation, JSON, object describing the IP and port of the said service, plus the protocol the service uses, preferably allowed values are HTTP or TCP. The MCC will register the service and return an endpoint to the service.

This endpoint is then stored in the DHST under that service name, so now if someone tries to look up that service, they will get said endpoint as a result. In this embodiment an endpoint corresponds to an address of a service inside the MCC network.

In an embodiment of the invention, endpoints have the following preferred format: protocol:node_id:number. The protocol can be either http or tcp, and it specifies how it is communicated to this service. The node_id is the DHST ID of the MCC node where the service was registered, preferably in a hexadecimal format. The number is used to allow more than one service be registered in the same MCC node.

In other words, in an specific embodiment protocol: node_id:number may be a endpoint of a service, i.e. value which is stored in the DHST under the key of the service and key of the service is simply the name of the service. So, for example, the endpoint may look like this: tcp:aabbcc:1 for a service called MyService. The MCC will thus store the string "tcp:aabbcc:1" in a key called "service/MyService", as described in more detail below.

Thus, the endpoint is similar to a Uniform Resource Locator (URL) of the service in the network; just like a URL it has a protocol, an IP and a port number. An endpoint would thus look like this http: 00112233445566778899001122334455667788 99:1. The endpoint is dependent on the MCC node where it was registered, so if someone tries to access that endpoint, it will always do it through that node. This also means that if an MCC node goes down, the services it was announcing to the network will no longer be reachable.

It is an advantage of the invention that the MCC's HTTP API also allows to open point-to-point connections to other nodes. This allows for example to look up a service and then connect to it using MCC.

The tunneling service exposes a reliable transport akin to TCP. The tunneling service is implemented using an efficient protocol on top of MCC's UDP protocol, adding very little overhead while still providing NAT traversal and a reliable transport.

Since it is implemented as an HTTP API, users do not need to implement MCC's protocol; therefore, existing applications can use MCC's tunneling with little or no modification.

Having a REST API allows MCC to be immediately compatible with thousands of HTTP-speaking apps, including Web Browsers. This opens a new horizon of distributed apps, allowing developers to easily interface their apps with distributed networks, without having to worry about protocol issues, NAT traversal and distributed storage.

Moreover, having an HTTP API enables developers to create web distributed apps, that is, apps that are entirely distributed and at the same time are run from a web browser, making the complex world of distributed systems much more accessible for the millions of web developers around the world.

Finally, the MCC exposes not only its Key/Value storage using a REST API but also its service discovery and proxying capabilities. This also offers a number of novel advantages. First, web services can now use MCC's proxying API to access remote services, even if these services are offered behind a firewall, for example to access IoT devices. Second, this allows for a cloud-native distributed service mesh, allowing services to talk to each other transparently through MCC, without having to worry about networking setup.

In an embodiment of the invention, as mentioned above, keys are preferably an SHA-1 hash of the data type plus the key name. To store a service, the service type is used. Therefore, as an example, if an Ethereum service is registered, it will be stored it in the DHST under the key service/Ethereum. After a service is registered, it can be reached using the tunneling service.

VI. Tunneling

In an embodiment of the invention, after a service is registered, it can be reached using the tunneling service of the MCC. FIG. 4 shows an embodiment of Service discovery and tunneling according to an embodiment of the invention.

Figure 7:
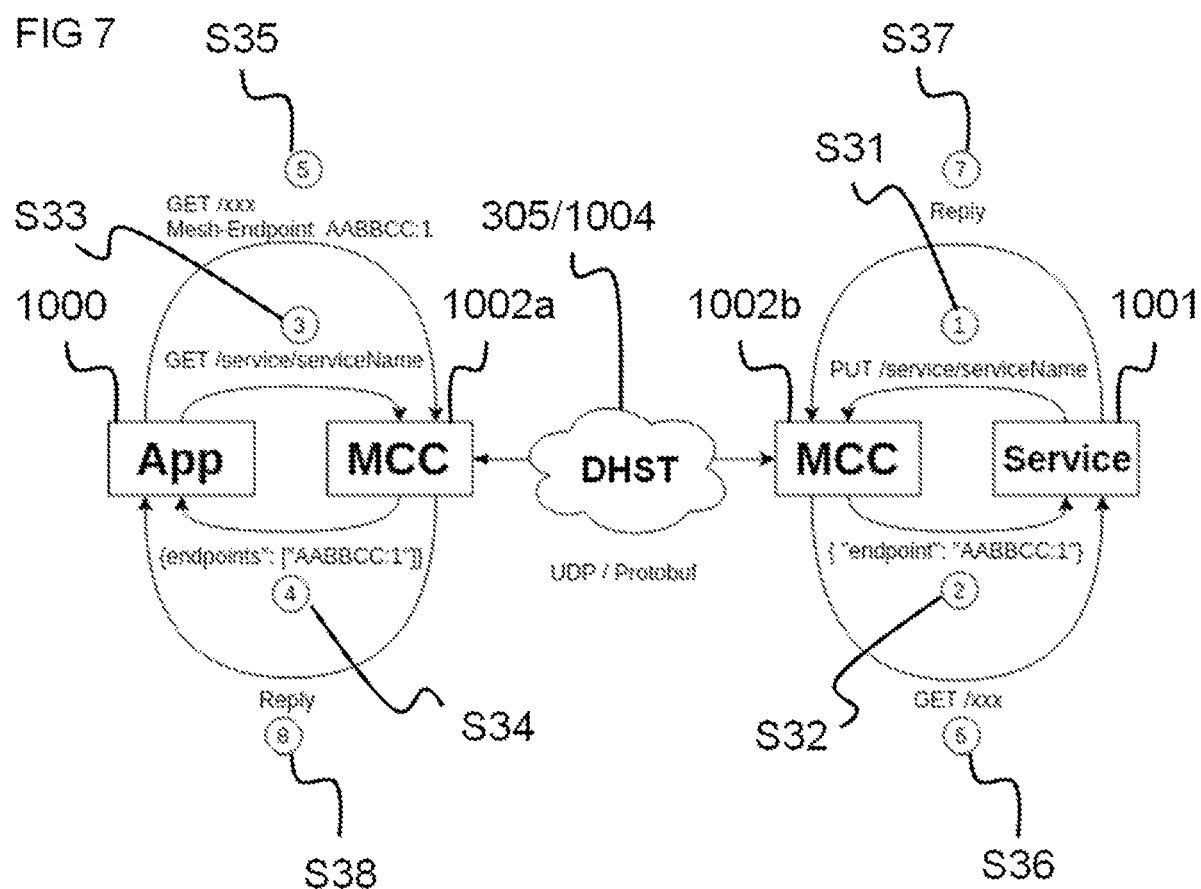
FIG. 7 shows service registration and discovery according to an embodiment of the invention.

FIG. 7 shows the service registration and discovery according to an embodiment of the invention. First the service 1001 registers itself in its closest MCC 1002*b*, in step S31. Then the MCC 1002b assigns it an endpoint number in step S32. Later a client application 1000 looks up the service 1001 using its MCC 1002a in step S33 and gets an endpoint list in step S34. Afterwards, the application 1000 decides to send a request to the service in step S35, the request is tunneled through the network 305/1004 and it finally arrives its destination in step S36, the service replies this request in step S37, and again this reply is tunneled through the network to finally arrive its destination S38. The DHST uses the UDP/Protobuf 1004 for communication as detailed above.

As can be seen in FIG. 7 and FIG. 4, the DHST based process is completely transparent for both the application and the service. The only thing the service has to do is to register itself, and then it will receive normal HTTP requests. Similarly, the only extra step the application has to take is to look the service up first, afterwards, it can send normal HTTP requests to the MCC network that will be transparently forwarded to the service.

This transparency is what makes the MCC according to the invention so powerful and so easy to integrate in current applications.

In an embodiment of the invention, two types of tunnels are supported, HTTP tunnels and TCP tunnels. The MCC corresponds to an HTTP proxy connecting an HTTP-compatible app with a REST service and TCP tunnels in which it behaves as a transparent, two-way binary connection.

VI.1 HTTP Tunneling

In an embodiment of the invention, after a service provider has registered itself and received an endpoint from the network, it can be accessed using the tunneling feature.

To send a request to an endpoint, the application has to send the request to its closest MCC node with the MCC-endpoint header set to the desired endpoint. If the MCC receives a request with the MCC-endpoint header set, it will simply forward the request transparently and return the reply from that request. The service will receive exactly the same request, with the same headers, as were sent in the first place. This also applies to the request reply; it will be forwarded verbatim to the requesting client. This is true for any HTTP request such as GET, POST, PUT, DELETE, etc.

To achieve this, the tunneling service first looks up the node ID in the endpoint. This is preferably done by doing a DHT lookup. After the node is found, the request is sent to the node.

It is important to note that in embodiments of the invention, all communication is preferably done through the closest MCC node, i.e., the MCC node where the service was registered in the first place.

An application never talks to the service directly, even if they were on the same network. all communication is done through the MCC network. This simplifies the code and enforces a single data path.

Similarly, no other MCC contacts the service provider directly, it is only contacted by its closest MCC, that is, the MCC node to which service provided registered. This also simplifies the network setup, as for example a firewall could be set up to only allow incoming connections from the MCC to the service. This enables and greatly simplifies NAT traversal.

In an embodiment of the invention, endpoints are chosen at random. This way a simple load balancing among different providers of a service is achieved.

VI.2 TCP Tunneling

In embodiments of the invention the MCC interface is HTTP compatible, and the CONNECT HTTP method is used to allow for transparent proxying.

Using this method, client applications can send an HTTP CONNECT request to the MCC and specify the MCC-endpoint header to tell the MCC node to which endpoint it would like to connect. The MCC will then try to establish a two-way connection to the endpoint; after the connection is established, it will return a 200 Ok after which the connection will be a transparent, two-way, binary link to the destination.

VII NAT Traversal for Distributed Hash Set Tables

The DHST according to the invention provides for storing keys in a network 400 in a way that this can then later be retrieved in a predictable way.

DHTs usually also specify which transport protocol should be used for better results, for example Kademlia uses UDP. However, Kademlia and other DHTs do not define how to deal with one of the most common network problems, Network Address Translation (NAT) traversal. It is true that with the arrival of IPv6, NAT traversal should not be an issue; however, most of the world still uses IPv4 and will probably do so for many years to come.

NAT is a technique that allows multiple devices inside a network talk to the outside world using only one public IP address. Without NAT, every single device inside the network would need a publicly routable IP address.

NATs are extremely popular today in IPv4, i.e. the most common version of the Internet Protocol, because the IPv4 address space is very limited, i.e. just 32 bit long. That is, there are not enough public IPs to every device in the world. The "solution" to the NAT problem is to switch to the latest version of IP, IPv6, which uses much larger addresses, i.e. 128 bit long, and therefore there are many more addresses than devices in the world.

However, only about 25% of the world uses IPv6 so far. This means that many DHTs have serious issues to work in NATed environments such as mobile networks and IoT.

The NAT issues are very common, especially in P2P networks like DHTs. Conventional solutions usually involve some external technology such as STUN and TURN to solve connectivity issues. This of course tends to go against the very principle of a distributed, P2P network, as the TURN and STUN servers are usually centralized somewhere.

The problem of centralized services is an operational problem, because if the network grows too much, the central STUN and/or TURN servers would need to scale accordingly. Also, that means that the network has a central point of failure.

In an embodiment of the invention, a method for NAT traversal is provided. The method is based on Kademlia messages. In preferred embodiments, the NAT traversal is based on methods and systems of a DHST as described above.

According to the invention the NAT traversal is an integral part of the MCC protocol. The NAT traversal according to the invention requires no additional central servers and it scales as the network scales.

According to the invention the network can detect the NAT status of each node and adjust to it, and even use nodes as a relay for the communication between two NATed nodes. This way it is ensured that there is always a way to connect two nodes.

Relayed Messages

In an exemplary embodiment, the NAT traversal includes relaying messages through a third node.

In an embodiment of the invention, the MCC protocol adds two fields to all messages: a Relay flag and a SourceAddress. The SourceAddress is preferably set to the IP address of the sender node.

The Relay flag has three possible values: NoRelay, DirectReply and IndirectReply. This flag controls how a reply message will be routed.

Figure 8A:
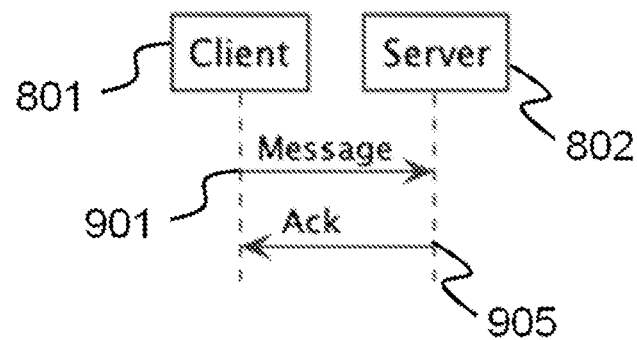
FIG. 8a shows a reply according to an embodiment of the invention with no relay.

FIG. 8a shows a reply according to an embodiment of the invention with no relay. The flag NoRelay causes the relay message to be relayed directly from its source to its destination. No relay is performed. A client 801 sends a message 901 to a server 802. The message contains a NoRelay. Thus the message is directly sent from the client 801 to the server 802. In an embodiment of the invention, each message is answered by an acknowledgement message, also referred to as Ack. In case of NoReply the Ack 905 is also send directly from the server 802 to the client 801.

It is noted that in this description the terms client and server are for illustrative purposes only. Client refers to a node of the data processing network which sends a message. Server refers to a node of the data processing network which receives a message.

Figure 8B:
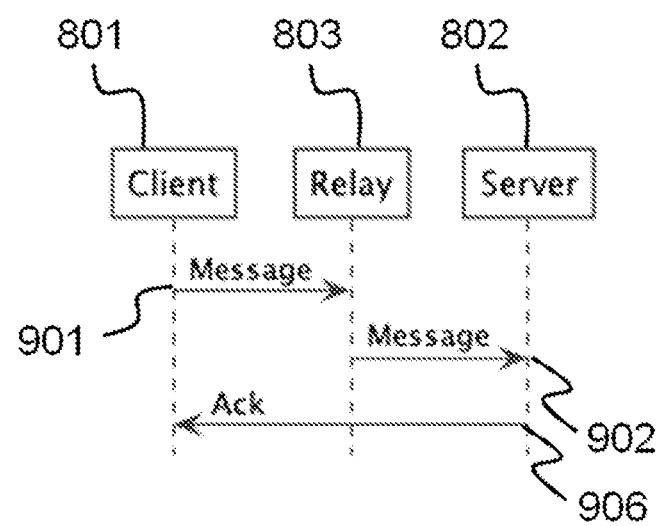
FIG. 8b shows a reply according to an embodiment of the invention with direct reply.

When DirectReply is set, the target node will reply directly to the sender, without going through a relay node. This is preferably used for UDP hole punching. FIG. 8b shows a reply according to an embodiment of the invention with direct reply. A client 801 sends a message 901 to a server 802. However, the message is relayed at a relay node 803. That is, the message 901 is sent from the client 801 to the relay node 803 and a relayed message 902 is sent from the relay node 803 to the server 802. The Ack 906 is sent directly from the server 802 to the client 801.

Figure 8C:
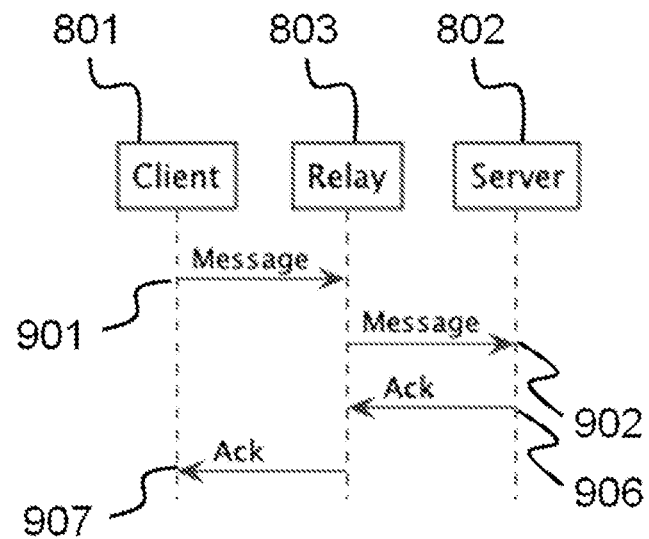
FIG. 8c shows a reply according to an embodiment of the invention with indirect reply.

On the other hand, when IndirectReply is set, the reply will also be relayed at the through the relay node. This is preferably used when UDP hole punching fails. FIG. 8c shows a reply according to an embodiment of the invention with indirect reply. A client 801 sends a message 901 to a server 802. However, the message is relayed at a relay node 803. That is, the message 901 is sent from the client 801 to the relay node 803 and a relayed message 902 is sent from the relay node 803 to the server 802. The Ack 906 is sent from the server 802 to the relay node 803 and a relayed Ack 907 is sent from the relay node to the client 801.

In detail, when a node receives a message with the Relay field set to anything but NoRelay, it is configured to statelessly forward the message to the node whose ID is specified in the To field. If the node specified in the To field is not in a node table of the receiving node, the message will be discarded.

In an embodiment of the invention, each node, i.e. the DHST, keeps a table with all the known nodes, ordered by XOR distance. However, the table according to the invention includes two additional fields to make it NAT-friendly. Nodes in the table will include, besides the Kademlia information, i.e. Node ID and last contact time, a Reachability field that can be: Direct or Indirect, and an Address, preferably an IP and/or UDP port.

The known node table is preferably updated in two ways:
1) every time a node receives a message from another node
2) every time a node gets information about another node, e.g. through a FindNode or FindValue message The above described known node table is internal to each node. It is stored in-memory on each node. The known node table may, and most often is, different for each node. This is based on a Kademlia concept. In Kademlia a corresponding table is called "k-Buckets" as discussed above.

If the Reachability field is Direct, the Address points directly to the IP of the node in question, if the Reachability field is Indirect, the Address field points to the IP of the node that was used to relay the message to this node.

Contacting Other Nodes

Since nodes of the data processing network 400 may be behind a firewall, a connection algorithm should be capable of NAT traversal with no further configuration. This problem is amplified when two nodes are behind firewalls want to talk to each other.

To allow these two firewalled nodes to talk, embodiments of the invention use a technique such as UDP hole punching. If UDP hole punching fails, e.g. in a case when both nodes are behind Symmetric NATs, a third node is used as a relay.

The relay method according to the invention performs a UDP hole punching and fits perfectly with the DHST protocol. The method uses DHST network to find a publicly reachable node to relay the messages between the two nodes involved, and attempt first a UDP hole punching, and if that fails, it will use a permanent relay.

In an embodiment of the invention, the relay node is chosen automatically by the DHST network, depending on how the nodes are connected to each other. Therefore there is no need to set up dedicated servers for the NAT traversal as would be required in a STUN/TURN setup.

Figure 9:
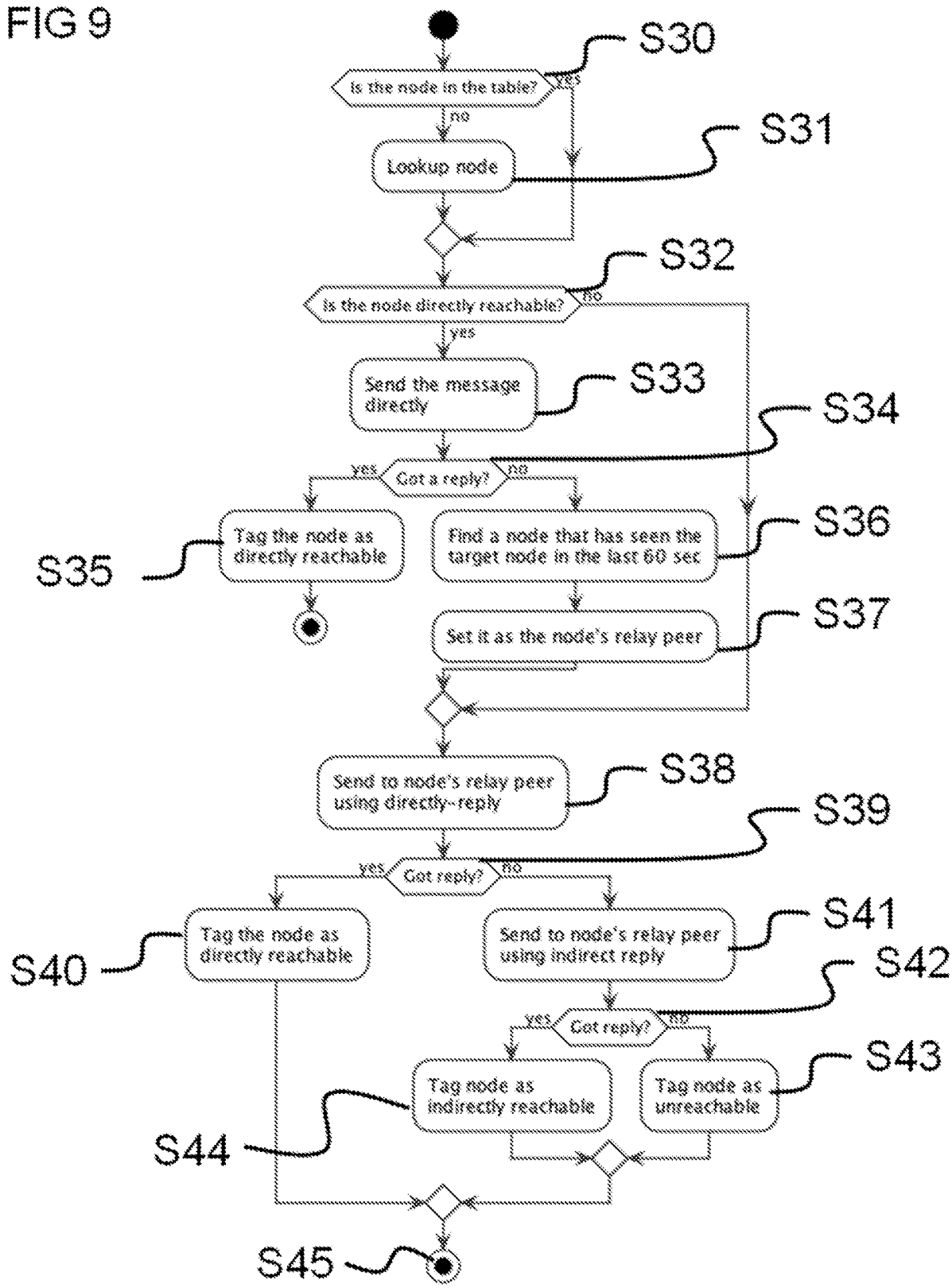
FIG. 9 shows a message relay method according to an embodiment of the invention.

FIG. 9 shows a message relay method according to an embodiment of the invention. When a node X wants to contact another node Z, for any type of message, it preferably uses the following procedure:

S30: If the Node ID of Z is in the node table of X going to step S32. If not going to S31

S31: Looking up the node IP address using the FindNode procedure.

S32: If the node Z is directly reachable by its peer continuing to next step, if not going to step S38.

S33: Sending the message directly to the node IP and wait 300 ms for a reply. Retry 2 times.

S34: Waiting for a reply. If a reply is received going to S35. If no reply is received go to S36.

S35: Tag the peer as directly reachable and end the procedure.

S36: Finding a node that has seen the target node Z recently, preferably in the last 60 seconds. Doing this by using a FindNode procedure. The relay node will be any node that has seen the target node Z recently, preferably in the last 60 seconds, and has tagged it as directly reachable.

S37: Setting the node we found in the previous step as the target node Z's relay node in the node table of X.

S38: Sending the message to the relay node setting the relay field to Direct reply, wait 300 ms for a reply. Retry 2 times.

S39: Waiting for a reply. If a reply is received going to S40. If not going to S41.

S40: Tagging the peer as directly reachable and end the procedure.

S41: Sending the message to its peer setting the relay field to Indirect reply, wait 500 ms for a reply. Retry 2 times.

S42: If a reply is received going to S44. If not going to S43.

S43: Giving up, and tagging the node as unreachable.

S44: Tag the peer as indirectly reachable using the peer's IP as relay and

S45 ending the procedure.

This method ensures that there is always a path between two nodes in the DHST network, covering every possible case:

A) If the destination node is in a public IP, the source node will simply open a direct connection to the destination.
B) If the destination node is not in a public IP but the source node is, the source node will ask the destination node to connect to the source, hence penetrating the destination NAT. This request will be relayed by the destination node's relay peers.

The term relay peer is used to refer to a node that is used as a relay between two nodes. Relay peers may be needed because in some cases, two nodes may unable to talk directly to each other, e.g. due to some exotic NATs, however, the nodes may be able to talk through a third node, the relay peer.

C) If both the destination and the source nodes are behind NATs, they will attempt to do UDP hole punching to penetrate both NATs. The relay nodes of the destination node will be used as brokers for the UDP hole punching procedure.
D) If the UDP hole punching procedure fails then all the communication will be relayed using a relay node automatically.

VIII MCC Protocol Overview

In a preferred embodiment of the invention, the MCC uses a custom UDP-based, Protobuf-encoded protocol, preferably a UDP-based binary protocol. The protocol is based in the Kademlia protocol, with some extensions to allow for tunneling and NAT traversal.

The MCC protocol is a simple request/reply protocol. Every message has to be acknowledged with a corresponding Ack message. This is so because the protocol is UDP based and it needs to be ensured that every message has been received; therefore, according to the invention, every message gets a reply. Preferably there is a corresponding Ack message for each message type.

In an embodiment of the invention, all messages contain the same structure except for ChannelData and ChannelDataAck messages, which are hereinafter referred to as channel messages. Non-channel messages, i.e. all other messages, preferably contain a From and a To field, with the Node ID of the source and the destination nodes.

Messages also preferably contain an RPCId field containing the sequence number of current message. The sequence number is an incremental integer, and each Ack message comprises the same sequence number as the request it is answering to.

Channel messages comprise a Channel Number field, and may further comprise a Data field in the case of a ChannelData message.

Optionally, Channel messages also comprise a To field in case the message needs to be relayed.

IX. Joining the Network

It is noted that for joining the network, the Kademdlia paper description may be used. However, a modified procedure according an embodiment of the invention is advantageous.

In a first embodiment of the invention, nodes first join the network before being able to access the DHST. Nodes are preferably configured to first perform a procedure to let other nodes know about the existence of this new node. The procedure to join the network according to this first embodiment is the following:
1. Send a Ping message to a bootstrap node, which can be any publicly available node.
2. If no reply is received from that node, try another until a reply is received.
3. Send a FindNode message for the node's own ID to the peer that replied.
4. After K close nodes were found, send a Ping message to each one of them, and keep pinging them, preferably once per minute. This will guarantee access in case of NATs.

The term bootstrap node refers to a known node which is used as an entry point to the distributed network. It is important to note that a distributed network is spread across the globe; thus, at least one node needs to be known in order to access the network, and this node will later provide addresses of other nodes. Blockchains and P2P networks utilize bootstrap nodes. There are different techniques to distribute the IP addresses of the bootstrap nodes.

Figure 10:
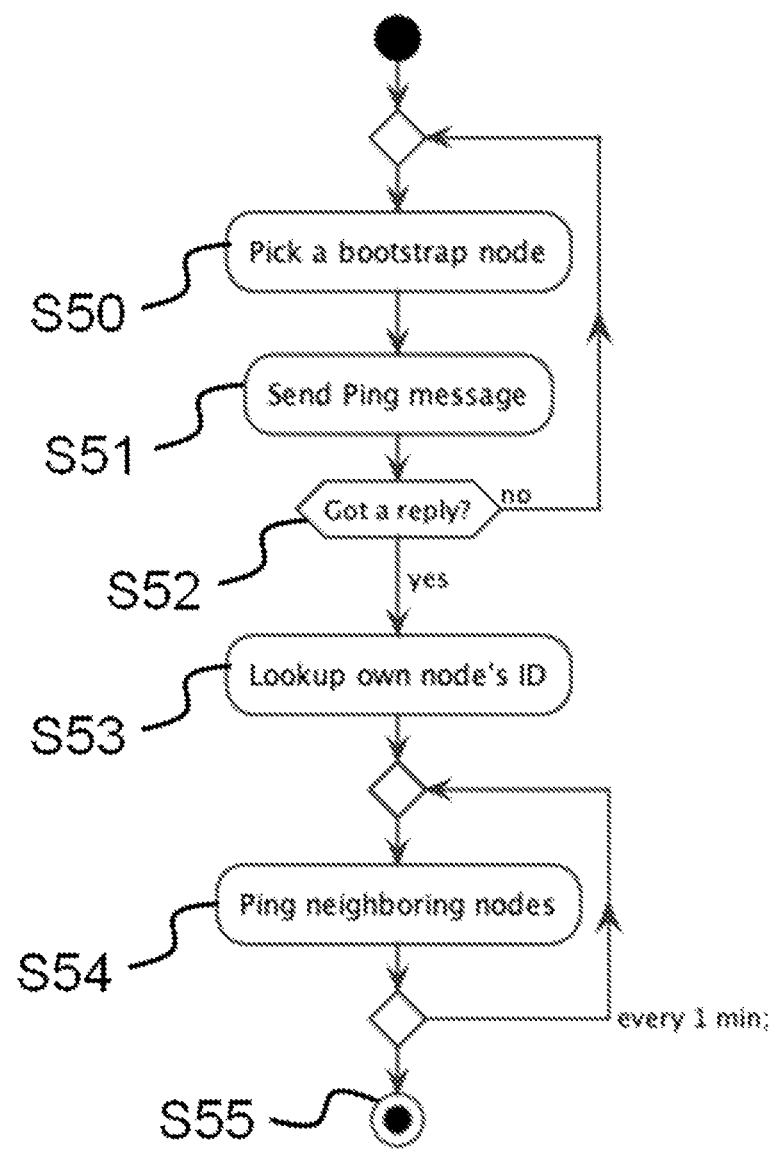
FIG. 10 shows a flowchart of the joining the network procedure according to an embodiment of the invention.

FIG. 10 shows a flowchart of the joining the network procedure according to an embodiment of the invention. In detail, the procedure includes the steps of:
S50: Picking a bootstrap node. Bootstrap nodes are preferably provided by the user.
S51: Sending a PING message to the bootstrap node
S52: Waiting for a reply. If no a reply is received, going back to S50. If a reply is received, continuing with the next step.
S53: Performing a FindNode procedure using the own Node ID as the target.
S54: Every 1 minute, sending a PING message to the nodes with the lowest distance to the sending node's ID.
S55: Ending the Procedure after a predetermined time, a predetermined number of repetitions, or a predetermined result.

X Channels

In an exemplary embodiment, the invention provides channels as a way in the MCC protocol to implement the tunneling feature. Channels are a two-way transparent data link. In embodiments of the invention, internally, the MCC protocol makes no distinction between HTTP or TCP tunnels. For the MCC protocol, a tunnel is a black box transporting some unspecified data.

In an embodiment of the invention, to open a channel, the client node has to send an OpenChannel message to a node that is closer to the destination, that is, the node where the destination service registered itself. The OpenChannel message preferably comprises the Endpoint ID of the destination service.

The receiving MCC node will then try to open a TCP or HTTP connection to the service in question, and if the connection is established, it will return an OpenChannelAck message to the client MCC node. This simplifies the channel setup flow, but this also means that if the service takes too long to accept the connection, the OpenChannel message may time out.

Therefore, it is preferred to have the MCC and the service on the same network, or preferably even the same machine.

After the client MCC node has received the OpenChannelAck message confirming the connection, the client and/or or the server can start sending information using ChannelData messages. ChannelData messages are confirmed with a ChannelDataAck.

Figure 11:
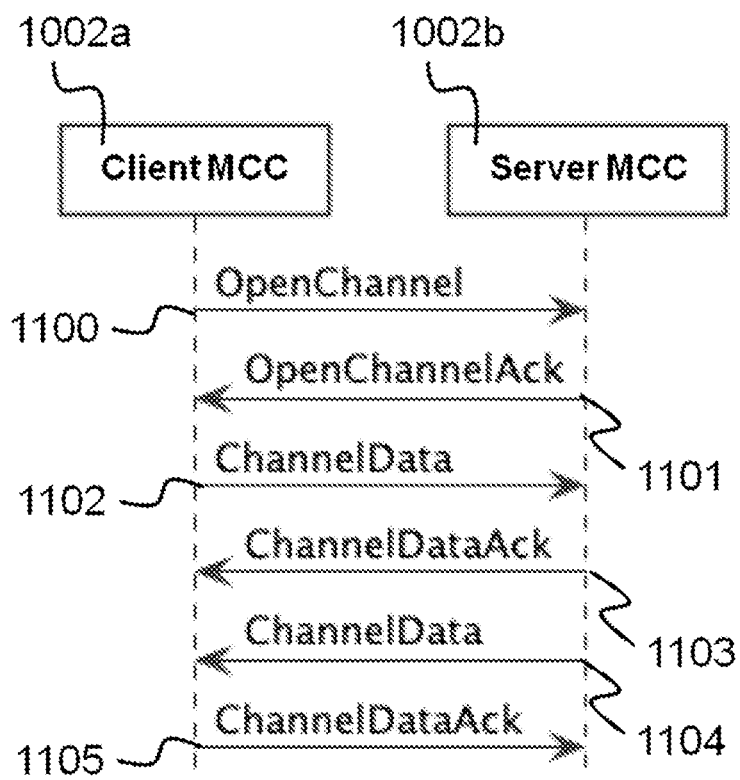
FIG. 11 shows channel communication according to an embodiment of the invention.

FIG. 11 shows channel communication according to an embodiment of the invention. A client MCC node 1002*a* sends an OpenChannel message 1100 to a server MCC node 1002*b*. The server MCC node 1002*b* returns an OpenChannelAck message 1101. Now channel data may be exchanged: The client MCC node 1002*a* sends a Channel- Data message 1102 and the server MCC node 1002b returns a ChannelDataAck 1103 message; or the server MCC node 1002b sends a ChannelData message 1104 and the client MCC node 1002a returns a ChannelDataAck 1105 message.

In an embodiment of the invention, a two-way handshake is used. In comparison, TCP uses a three-way handshake. Therefore, in an embodiment of invention, the client may, in theory, receive a ChannelData message before it even receives the OpenChannelAck from the OpenChannel message.

This means that a client may receive data messages for channels it doesn't (yet) know. To deal with this situation, according to an embodiment of the invention, clients will cache any ChannelData message it receives for an unknown channel for a predetermined period, preferably for 2 seconds, without acknowledging them, in a case the client is waiting for an OpenChannelAck from an OpenChannel message.

In an embodiment of the invention, a channel number is created when sending an OpenChannel message. Therefore, when during the predetermined period a node receives the OpenChannelAck and the channel ID in the OpenChannelAck matches the one in any of the cached messages, the client will return ChannelDataAck messages for those messages and process them normally.

Figure 12:
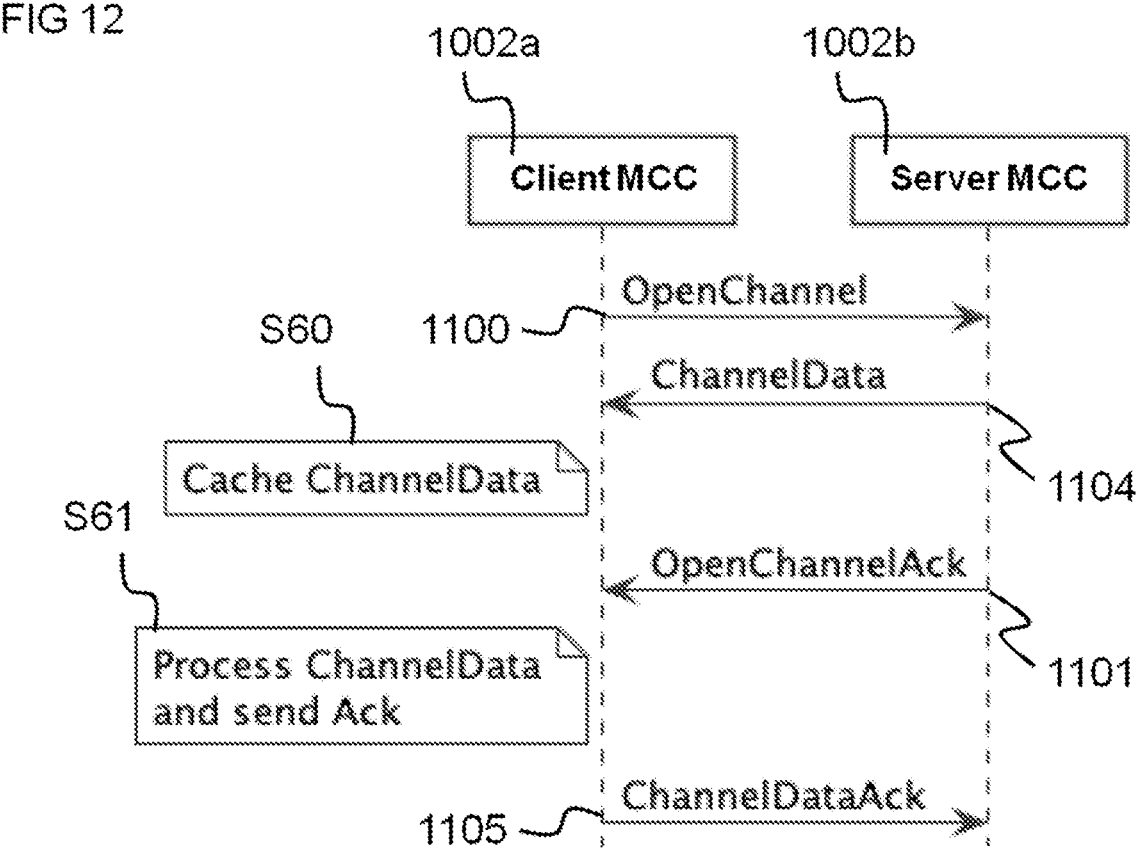
FIG. 12 shows channel communication with caching according to an embodiment of the invention.

FIG. 12 shows channel communication with caching according to an embodiment of the invention. A client MCC node 1002a sends an OpenChannel 1100 message to a server MCC node 1002b. However, before receiving the corresponding OpenChannelAck 1101 message from the server MCC node the client MCC node receives a ChannelData 1104 message. The client MCC node caches the channel data from the unknown, i.e. not acknowledged, channel for a predetermined period of time in step S60. In case the client MCC node 1002a subsequently receives a corresponding OpenChannelAck 1101 message from the server MCC node 1002a, in step S61 the client MCC node 1002a processes the channel data and sends a corresponding ChannelDataAck 1105 message to the server MCC node 1002b. The caching may also be performed on the server MCC node side.

Both OpenChannel and ChannelData messages may be relayed through a third party, like other messages. However, ChannelData messages preferably do not support DirectReply mode; they are either fully relayed Indirect Reply or direct Reply.

This simplifies ChannelData messages and hence reduces the overhead. Furthermore, because the Indirect Reply mode is only designed to facilitate UDP hole punching, this can be done with an OpenChannel message instead, which makes it unnecessary in ChannelData messages.

XI. Security

In embodiments of the invention, security is preferably implemented as a simple Pre Shared Key (PSK). All messages will be first encrypted using a key and then sent. This will provide a basic level of security.

Further embodiments of the invention may implement a more advanced security framework.

XII. Definitions

The below definitions of the Protocol and the API relate to exemplary embodiments and aspects of the invention and is intended to illustrate the invention by way of a programming guideline and is not intended to limit the invention. To improve intelligibility, repetition of descriptions is omitted wherever appropriate.

XII.1 Protocol Messages Definition

As described above, the MCC uses a binary encoding, preferably a Protobuf encoding, for the messages. A binary encoding means that the data is coded like bytes and not like ASCII, and it is therefore not human readable. For example, JSON is not binary encoding.

Most messages, except ChannelData, have a common header. Hereinafter, the structure of these messages is described:
Common Types
  ID: preferably 20 byte strings, used for nodes and keys.
  Address: preferably a combination of a 32-bit IPv4 address and a 16-bit port.
  Endpoint: preferably a Node ID plus an integer
Common Header
  From (ID): preferably 20 bytes of the sender's NodeID.
  To (ID): preferably 20 bytes of the receiver's NodeID.
  RPCId (uint32): The sequence number of this message.
  Source (ID, optional): The ID of the original sender, in case the message is relayed.
  SourceAddress (Address, optional):
    Address of the original sender, in case the message is relayed.
    #### ReplyRelay (enum)
      No
      Direct
      Indirect
  Relay (ReplyRelay): The Relay mode for this message
Ping
  Common header
PingAck
  Common header
FindNode
  Common header
  TargetID (ID): Node ID of the node we're trying to find.
FindNodeAck
  Common header #### ReplyRelay (enum)
    RELAYED #### Info
    DIRECT
    Id (ID): NodeID of the node.
    Relay (ReplyRelay): The relay mode.
    Address (Address): Address of the node or the relay.
    LastSeen (Timestamp): Timestamp of last successful data exchange.
  [ ] Infos (Info): List of nodes.
Add
  Common header
  Key (ID): The Key to be stored to.
  Value (bytes): The value to be store.
  TTL (int): expiration time
AddAck
  Common header
GetAck
  Common header
  [ ] Values (bytes): The associated set of values to the send key.
Get
  Common header
  Key (bytes): The Key to be geted.

OpenChannel
　Common header
　　Endpoint (Endpoint): The endpoint to which we would like to open a channel.
　　ChannelNum (uint32): A channel number, to unequivocally identify the channel.
OpenChannelAck
　Common header
　　ChannelNum (uint32): A channel number, to unequivocally identify the channel. ChannelData
　　ChannelNum (uint32): A channel number, to unequivocally identify the channel.
　　Data (bytes): The data contained in this message.
ChannelDataAck
　　ChannelNum (uint32): A channel number, to unequivocally identify the channel.

XII.2 API Definition

In an embodiment of the invention, the MCC also implements a REST API to communicate with the clients and the services that want to use it. The REST API is not used by the MCC nodes to talk to each other; to do that they use the MCC binary protocol (see above).

GET/[Path]

Headers
　MCC-endpoint: the endpoint ID as returned by the/service query. This call will forward an HTTP request to the specified endpoint in the MCC-endpoint header. The request is forwarded to the destination verbatim, only the MCC-endpoint header is removed, the other headers and the path is the same as in the original request. The endpoint must be an HTTP endpoint, otherwise this will fail returning a 400 Bad request.

PUT/Service/[Service]

Headers
　None
Body
　protocol: This can be either http or tcp.
　ip-address: The IP address of the service provider
　port: The port of the service provider
This request will register a service in the DHST and assign an Endpoint ID to it.

GET/Service/[Service]

Headers
　None
This request will do a lookup in the DHT and return the endpoints registered for that service.

DELETE/Service/[Service]

Headers
　None
This request will remove the Endpoint ID assigned to the service and the service itself in the node where it was registered. Please be aware that this operation does not assure that the whole network will remove the service so you might be able to find it afterwards but you won't be able to access it via MCC.

CONNECT

Headers
　MCC-endpoint: the endpoint ID as returned by the/service query.
This request will open a two-way tunnel to the given endpoint. The endpoint must be a TCP endpoint, otherwise this will fail returning a 400 Bad request.

GET/value/[key]

Headers
　None
This request will do a lookup in the DHST and return the stored values in the DHST for that key.

POST/Value/

Headers
　None
Body
　key: The key to store.
　value: The value to store.
This request will store a key-value in the DHST.

GET/Routing/

Headers
　None
This request will return the nodes stored in the routing table of the node.

GET/Health

Headers
　None
This request will check whether node is connected to the network.
If the node is connected, i.e. has other nodes in its routing table, this will return 200 OK.
Otherwise, it will return 503 Service Unavailable. Response body will contain current timestamp and boolean value indicating if node is connected.

What has been described and illustrated herein are exemplary embodiments of the invention along with some of variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Abbreviations

API Application Programming Interface
DHT Distributed Hash Table
DHST Distributed Hash Set Table
IOT Internet of Things
JSON JavaScript Object Notation
MCC Mesh Companion Container
MESH Management Ecosystem of Superdistributed Hashes
NAT Network address translation
Protobuf Protocol Buffers
PSK Pre Shared Key
REST REpresentational State Transfer
RPC Remote Procedure Call
STUN Session Traversal Utilities for NAT
TURN Traversal Using Relays around NAT
UDP User Datagram Protocol
UI UserInterface

The invention claimed is:
1. A method for distributed service management in a distributed data processing network comprising a plurality of network nodes, the method comprising:
running, by client nodes and service provider nodes, respective instances of a distributed service management unit of the distributed data processing network, wherein the distributed service management unit comprises a distributed hash set table (DHST) configured to store and retrieve one or more datasets, wherein each dataset comprises a key and one or more values, and wherein the DHST is indexed by the key;
providing, by the distributed service management unit, an application programming interface (API), wherein the API provides an HTTP or a transmission control protocol (TCP) tunnel between a client node and a service provider node;
registering, by a service provider, a service on a network node;
storing, by the registering network node, an endpoint of the service as a value in a dataset of the DHST with a key corresponding to the service, wherein storing the endpoint of the service as a value in the dataset comprises the DHST finding the K network nodes whose ID is closest to the key's hash and storing the value by appending the value to the dataset, wherein K is a constant, and wherein closeness is determined based on a distance metric with regard to a respective key and a respective address of a respective network node;
requesting, by the client node, the service; and
retrieving, by the distributed service management unit, all endpoints stored as values in the DHST with the key corresponding to the service, wherein retrieving all endpoints stored as values in the DHST with the key corresponding to the service comprises the DHST finding a first value and continuing to visit all closest network nodes to the key until all values have been retrieved.
2. The method according to claim 1, wherein the endpoint is used as an address to connect to the service via the distributed service management unit; and
wherein the endpoint is a string comprising information about: a protocol used for communication with the service, a network node identifier of the registering network node of the service, and/or an identifier of the service on the registering network node.
3. The method according to claim 1, wherein the key corresponding to the service is a string that comprises type information about the key and name information of the service.
4. The method according to claim 3, wherein a hash of the string is used as the key in the DHST.
5. The method according to claim 4, wherein the hash is an SHA-1 hash.
6. The method according to claim 1, wherein the API provides an HTTP tunnel between the client node and the service provider node;
wherein the client node sends a request to the endpoint by sending a request message to the closest network node of the distributed service management unit, wherein the request message comprises the endpoint in a header; and
wherein a node of the distributed service management unit receives the request message with the endpoint in the header, forwards the request message transparently to the service provider node, and returns a reply message in response to the request message.
7. The method according to claim 1, wherein the API provides a TCP tunnel between the client node and the service provider node;
wherein the client node sends an HTTP CONNECT request message to the distributed service management unit and specifies the endpoint in a header, and the distributed service management unit attempts to establish a two-way connection to the endpoint; and
wherein after the connection is established, the distributed service management unit returns a confirmation message, after which the connection will be a transparent, two-way, binary link between the client node and the service provider node.
8. The method according to claim 7, wherein the confirmation message is a 200 OK message.
9. A distributed service management system, comprising:
client nodes and service provider nodes configured to run respective instances of a distributed service management unit, wherein the distributed service management unit comprises a distributed hash set table (DHST) configured to store and retrieve one or more datasets, wherein each dataset comprises a key and one or more values and the DHST is indexed by the key;
wherein the distributed management unit is configured to provide an application programming interface (API), wherein the API is configured to provide an HTTP or a transmission control protocol (TCP) tunnel between a client node and a service provider node;
wherein the distributed service management system further comprises a registering network node configured to, based on a service provider registering a service on the registering network node, store an endpoint of the service as a value in a dataset of the DHST with a key corresponding to the service, wherein storing the endpoint of the service as a value in the dataset comprises the DHST finding the K network nodes whose ID is closest to the key's hash and storing the value by appending the value to the dataset, wherein K is a constant, and wherein closeness is determined based on a distance metric with regard to a respective key and a respective address of a respective network node; and wherein the client node is configured to request the service; and wherein the distributed service management unit is configured to, based on the client node requesting the service, retrieve all endpoints stored as values in the DHST with the key corresponding to the service, wherein retrieving all endpoints stored as values in the DHST with the key corresponding to the service comprises the DHST finding a first value and continuing to visit all closest network nodes to the key until all values have been retrieved.

10. The distributed service management system according to claim 9, wherein the endpoint is used as an address to connect to the service via the distributed service management unit; and wherein the endpoint is a string comprising information about: a protocol used for communication with the service, a network node identifier of the registering network node of the service, and/or an identifier of the service on the registering network node.

11. The distributed service management unit according to claim 9, wherein the key corresponding to the service is a string that comprises type information about the key and name information of the service.

12. The distributed service management unit according to claim 11, wherein a hash of the string is used as the key in the DHST.

13. The distributed service management unit according to claim 12, wherein the hash is an SHA-1 hash.

14. The distributed service management system according to claim 9, wherein the API is configured to provide an HTTP tunnel between the client node and the service provider node;

wherein the client node is configured to send a request to an endpoint by sending a request message to the closest network node of the distributed service management unit, wherein the request message comprises the endpoint in a header; and wherein a node of the distributed service management unit is configured to receive the request message with the endpoint in the header, forward the request message transparently to the service provider node, and return a reply message in response to the request message.

15. The distributed service management system according to claim 9, wherein the API is configured to provide a TCP tunnel between the client node and the service provider node;

wherein the client node is configured to send an HTTP CONNECT request message to the distributed service management unit and specify the endpoint in a header;

wherein the distributed service management unit is configured to attempt to establish a two-way connection to the endpoint, and after the connection is established, return a confirmation message, after which the connection will be a transparent, two-way, binary link between the client node and the service provider node.

16. The distributed service management system according to claim 15, wherein the confirmation message is a 200 OK message.

17. One or more non-transitory computer-readable mediums having processor-executable instructions stored thereon for distributed service management in a distributed data processing network comprising a plurality of network nodes, wherein the processor-executable instructions, when executed, facilitate;

running, by client nodes and service provider nodes, respective instances of a distributed service management unit of the distributed data processing network, wherein the distributed service management unit comprises a distributed hash set table (DHST) configured to store and retrieve one or more datasets, wherein each dataset comprises a key and one or more values, and wherein the DHST is indexed by the key;

providing, by the distributed service management unit, an application programming interface (API), wherein the API provides an HTTP or a transmission control protocol (TCP) tunnel between a client node and a service provider node;

registering, by a service provider, a service on a network node;

storing, by the registering network node, an endpoint of the service as a value in a dataset of the DHST with a key corresponding to the service, wherein storing the endpoint of the service as a value in the dataset comprises the DHST finding the K network nodes whose ID is closest to the key's hash and storing the value by appending the value to the dataset, wherein K is a constant, and wherein closeness is determined based on a distance metric with regard to a respective key and a respective address of a respective network node;

requesting, by the client node, the service; and retrieving, by the distributed service management unit, all endpoints stored as values in the DHST with the key corresponding to the service, wherein retrieving all endpoints stored as values in the DHST with the key corresponding to the service comprises the DHST finding a first value and continuing to visit all closest network nodes to the key until all values have been retrieved.

* * * * *